(12) United States Patent
Virtue, Jr. et al.

(10) Patent No.: US 10,443,543 B2
(45) Date of Patent: Oct. 15, 2019

(54) HIGH COMPRESSOR BUILD CLEARANCE REDUCTION

(71) Applicant: United Technologies Corporation, Farmington, CT (US)

(72) Inventors: John P. Virtue, Jr., Middletown, CT (US); Rishon Saftler, Glastonbury, CT (US); Frederick M. Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 580 days.

(21) Appl. No.: 15/343,470

(22) Filed: Nov. 4, 2016

(65) Prior Publication Data
US 2018/0230946 A1  Aug. 16, 2018

(51) Int. Cl.
*F01D 19/02* (2006.01)
*F02K 3/068* (2006.01)
(Continued)

(52) U.S. Cl.
CPC .............. *F02K 3/068* (2013.01); *F01D 11/18* (2013.01); *F01D 19/00* (2013.01); *F01D 25/164* (2013.01);
(Continued)

(58) Field of Classification Search
CPC ........ F01D 11/22; F01D 11/127; F01D 25/34; F01D 25/36; F01D 25/164; F02C 7/27;
(Continued)

(56) References Cited

U.S. PATENT DOCUMENTS

| 1,951,875 A | 3/1934 | Laabs |
| 2,617,253 A | 11/1952 | Fusner et al. |

(Continued)

FOREIGN PATENT DOCUMENTS

| EP | 1258618 A2 | 11/2002 |
| EP | 2305986 | 4/2011 |

(Continued)

OTHER PUBLICATIONS

European Search Report for Application No. EP17194050, dated Feb. 8, 2018 (6 pp.).

(Continued)

*Primary Examiner* — Ninh H. Nguyen
(74) *Attorney, Agent, or Firm* — Cantor Colburn LLP

(57) ABSTRACT

An aspect includes a system including a high compressor of a gas turbine engine having a ratio of a cold-rotor build clearance to a span between 0.7% and 7%. The cold-rotor build clearance is defined for a plurality of rotor blades of the high compressor with respect to an engine casing assembly interior surface of the high compressor, and the span is defined as a gap between a rotor disk of the high compressor and the engine casing assembly interior surface of the high compressor for at least a last two stages of the high compressor closest to a combustor section of the gas turbine engine. The system also includes at least two bowed rotor management systems for the gas turbine engine to prevent damage to the rotor blades for a bowed rotor condition of the high compressor under a plurality of operating conditions.

20 Claims, 12 Drawing Sheets

(51) Int. Cl.

| | | |
|---|---|---|
| *F02K 3/075* | (2006.01) | |
| *F04D 29/64* | (2006.01) | |
| *F01D 11/18* | (2006.01) | |
| *F02K 3/02* | (2006.01) | |
| *F02K 3/06* | (2006.01) | |
| *F01D 19/00* | (2006.01) | |
| *F01D 25/16* | (2006.01) | |
| *F01D 25/36* | (2006.01) | |
| *F02C 7/26* | (2006.01) | |
| *F02C 7/32* | (2006.01) | |
| *F02C 9/42* | (2006.01) | |
| *F02K 3/11* | (2006.01) | |
| *B64D 27/00* | (2006.01) | |

(52) U.S. Cl.
CPC ............... *F01D 25/36* (2013.01); *F02C 7/26* (2013.01); *F02C 7/32* (2013.01); *F02C 9/42* (2013.01); *F02K 3/025* (2013.01); *F02K 3/06* (2013.01); *F02K 3/075* (2013.01); *F04D 29/642* (2013.01); *B64D 2027/005* (2013.01); *F01D 25/16* (2013.01); *F02K 3/11* (2013.01); *F05D 2220/3219* (2013.01); *F05D 2220/36* (2013.01); *F05D 2260/80* (2013.01); *F05D 2260/84* (2013.01); *F05D 2260/85* (2013.01); *Y02T 50/671* (2013.01)

(58) Field of Classification Search
CPC ...... F02C 7/277; F04D 29/668; F04D 25/526; F05D 2220/3219; F05D 2260/85; F05D 2260/96

See application file for complete search history.

(56) References Cited

U.S. PATENT DOCUMENTS

| | | | |
|---|---|---|---|
| 2,840,987 A | 7/1958 | Bloomberg et al. | |
| 2,962,597 A | 11/1960 | Evans | |
| 3,057,155 A | 10/1962 | Rizk | |
| 3,151,452 A | 10/1964 | Bunger et al. | |
| 3,764,815 A | 10/1973 | Habock et al. | |
| 3,793,905 A | 2/1974 | Black et al. | |
| 3,812,378 A | 5/1974 | Coman | |
| 3,898,439 A | 8/1975 | Reed et al. | |
| 3,951,008 A | 4/1976 | Schneider et al. | |
| 4,044,550 A | 8/1977 | Vermilye | |
| 4,069,424 A | 1/1978 | Burkett | |
| 4,144,421 A | 3/1979 | Sakai | |
| 4,380,146 A | 4/1983 | Yannone et al. | |
| 4,598,551 A | 7/1986 | Dimitroff, Jr. et al. | |
| 4,627,234 A | 12/1986 | Schuh | |
| 4,669,893 A * | 6/1987 | Chalaire | F16F 15/0237 384/535 |
| 4,713,985 A | 12/1987 | Ando | |
| 4,733,529 A | 3/1988 | Nelson et al. | |
| 4,854,120 A | 8/1989 | Nelson et al. | |
| 4,979,362 A | 12/1990 | Vershure, Jr. | |
| 5,103,629 A | 4/1992 | Mumford et al. | |
| 5,123,239 A | 6/1992 | Rodgers | |
| 5,127,220 A | 7/1992 | Jesrai et al. | |
| 5,174,109 A | 12/1992 | Lampe | |
| 5,184,458 A | 2/1993 | Lampe et al. | |
| 5,201,798 A | 4/1993 | Hogan | |
| 5,349,814 A | 9/1994 | Ciokajlo et al. | |
| 6,146,090 A | 11/2000 | Schmidt | |
| 6,168,377 B1 | 1/2001 | Wolfe et al. | |
| 6,190,127 B1 | 2/2001 | Schmidt | |
| 6,318,958 B1 | 11/2001 | Giesler et al. | |
| 6,478,534 B2 | 11/2002 | Bangert et al. | |
| 6,498,978 B2 | 12/2002 | Leamy et al. | |
| 6,517,314 B1 | 2/2003 | Burnett et al. | |
| 6,558,118 B1 | 5/2003 | Brisson et al. | |
| 6,681,579 B2 | 1/2004 | Lane et al. | |
| 6,762,512 B2 | 7/2004 | Nelson | |
| 6,884,027 B2 * | 4/2005 | Faulkner | F01D 5/225 415/173.3 |
| 6,935,836 B2 * | 8/2005 | Ress, Jr. | F01D 11/025 415/173.2 |
| 7,104,072 B2 | 9/2006 | Thompson | |
| 7,133,801 B2 | 11/2006 | Song | |
| 7,409,319 B2 | 8/2008 | Kant et al. | |
| 7,428,819 B2 | 9/2008 | Cataldi et al. | |
| 7,507,070 B2 | 3/2009 | Jones | |
| 7,513,119 B2 | 4/2009 | Zielinski et al. | |
| 7,543,439 B2 | 6/2009 | Butt et al. | |
| 7,587,133 B2 | 9/2009 | Franke et al. | |
| 7,742,881 B2 | 6/2010 | Muralidharan et al. | |
| 7,909,566 B1 | 3/2011 | Brostmeyer | |
| 7,972,105 B2 | 7/2011 | Dejoris et al. | |
| 8,090,456 B2 | 1/2012 | Karpman et al. | |
| 8,291,715 B2 | 10/2012 | Libera et al. | |
| 8,306,776 B2 | 11/2012 | Ihara et al. | |
| 8,770,913 B1 | 7/2014 | Negron et al. | |
| 8,776,530 B2 | 7/2014 | Shirooni et al. | |
| 8,820,046 B2 | 9/2014 | Ross et al. | |
| 8,918,264 B2 | 12/2014 | Jegu et al. | |
| 9,046,111 B2 * | 6/2015 | Harvey | F04D 29/324 |
| 9,086,018 B2 | 7/2015 | Winston et al. | |
| 9,121,309 B2 | 9/2015 | Geiger | |
| 9,732,762 B2 * | 8/2017 | Duong | F01D 5/141 |
| 2002/0173897 A1 | 11/2002 | Leamy et al. | |
| 2003/0145603 A1 | 8/2003 | Reed et al. | |
| 2004/0000656 A1 | 1/2004 | Wiggins et al. | |
| 2004/0131138 A1 | 7/2004 | Correia et al. | |
| 2009/0301053 A1 | 12/2009 | Geiger | |
| 2010/0085676 A1 | 4/2010 | Wilfert | |
| 2010/0095791 A1 | 4/2010 | Galloway | |
| 2010/0132365 A1 | 6/2010 | Labala | |
| 2010/0293961 A1 | 11/2010 | Tong et al. | |
| 2011/0077783 A1 | 3/2011 | Karpman et al. | |
| 2011/0146276 A1 | 6/2011 | Sathyanarayana et al. | |
| 2011/0153295 A1 | 6/2011 | Yerramalla et al. | |
| 2011/0296843 A1 | 12/2011 | Lawson, Jr. | |
| 2012/0240591 A1 | 9/2012 | Snider et al. | |
| 2012/0266601 A1 | 10/2012 | Miller | |
| 2012/0266606 A1 | 10/2012 | Zeiner et al. | |
| 2013/0031912 A1 | 2/2013 | Finney et al. | |
| 2013/0091850 A1 | 4/2013 | Francisco | |
| 2013/0101391 A1 | 4/2013 | Szwedowicz et al. | |
| 2013/0251501 A1 | 9/2013 | Araki et al. | |
| 2014/0123673 A1 | 5/2014 | Mouze et al. | |
| 2014/0154087 A1 * | 6/2014 | Kirchner | F01D 5/141 416/223 R |
| 2014/0199157 A1 | 7/2014 | Haerms et al. | |
| 2014/0241878 A1 | 8/2014 | Herrig et al. | |
| 2014/0271152 A1 | 9/2014 | Rodriguez | |
| 2014/0283527 A1 | 9/2014 | Ling et al. | |
| 2014/0301820 A1 | 10/2014 | Lohse et al. | |
| 2014/0318144 A1 | 10/2014 | Lazzeri et al. | |
| 2014/0334927 A1 | 11/2014 | Hammerum | |
| 2014/0366546 A1 | 12/2014 | Bruno et al. | |
| 2014/0373518 A1 | 12/2014 | Manneville et al. | |
| 2014/0373552 A1 | 12/2014 | Zaccaria et al. | |
| 2014/0373553 A1 | 12/2014 | Zaccaria et al. | |
| 2014/0373554 A1 | 12/2014 | Pech et al. | |
| 2015/0016949 A1 | 1/2015 | Smith | |
| 2015/0115608 A1 | 4/2015 | Draper | |
| 2015/0121874 A1 | 5/2015 | Yoshida et al. | |
| 2015/0128592 A1 | 5/2015 | Filiputti et al. | |
| 2015/0159625 A1 | 6/2015 | Hawdwicke, Jr. et al. | |
| 2015/0167553 A1 | 6/2015 | Nesdill et al. | |
| 2016/0348588 A1 * | 12/2016 | Ross | F01D 19/02 |
| 2018/0022463 A1 | 1/2018 | Teicholz et al. | |
| 2018/0022464 A1 | 1/2018 | Gelwan et al. | |
| 2018/0022465 A1 | 1/2018 | Gelwan et al. | |
| 2018/0023413 A1 | 1/2018 | Chowdhury et al. | |
| 2018/0023479 A1 | 1/2018 | Clauson et al. | |
| 2018/0023484 A1 | 1/2018 | Gelwan et al. | |

(56) References Cited

U.S. PATENT DOCUMENTS

| | | |
|---|---|---|
| 2018/0094588 A1 | 4/2018 | Clauson et al. |
| 2018/0149090 A1 | 5/2018 | Maalouf et al. |

FOREIGN PATENT DOCUMENTS

| | | |
|---|---|---|
| EP | 2514949 A2 | 10/2012 |
| EP | 3205836 A1 | 8/2017 |
| EP | 3205843 A1 | 8/2017 |
| EP | 3205849 A1 | 8/2017 |
| EP | 3205859 A1 | 8/2017 |
| EP | 3208429 A1 | 8/2017 |
| EP | 3273007 A1 | 1/2018 |
| EP | 3273008 A1 | 1/2018 |
| FR | 2933131 | 1/2010 |
| GB | 1186375 | 4/1970 |
| GB | 1374810 | 11/1974 |
| GB | 2117842 | 10/1983 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |
| WO | 2015145034 A1 | 10/2015 |

OTHER PUBLICATIONS

Extended European Search Report for Application No. 17181728.1-1607 dated Dec. 21, 2017 (8 pp.).
Extended European Search Report for Application No. 17181931.1-1607 dated Dec. 8, 2017 (7 pp.).
Extended European Search Report for Application No. 17181979.0-1607 dated Dec. 13, 2017 (8 pp.).
Extended European Search Report for Application No. 17182145.7-1607 dated Dec. 7, 2017 (7 pp.).
Extended European Search Report for Application No. 17182405.5-1607 dated Dec. 18, 2017 (7 pp.).
EP Application No. 17200204.0 Extended EP Search Report dated May 15, 2018, 6 pages.
Extended European Search Report for Application No. 17182126.7-1007, dated Feb. 16, 2018 (7 pp.).
Extended European Search Report for Application No. 17199896.6-1006, dated Mar. 7, 2018 (11 pp.).

\* cited by examiner

HIGH COMPRESSOR BUILD CLEARANCE REDUCTION

BACKGROUND

This disclosure relates to gas turbine engines, and more particularly to systems and methods to enable high compressor build clearance reduction in a gas turbine engine.

Gas turbine engines are used in numerous applications, one of which is for providing thrust to an airplane. When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a bowed rotor condition it is undesirable to restart or start the engine. The bowing effect is typically the greatest in a high compressor section of the engine that is closest to the combustor section of the engine.

One approach to avoid damage associated with bowed rotor deflection is to open build clearances in the high compressor section of the engine such that compressor rotor blades cannot contact other engine surfaces at the maximum deflection due to a bowed rotor condition. However, greater compressor build clearances can result in reduced compressor efficiency, reduced compressor stability, and increased fuel burn.

BRIEF DESCRIPTION

In an embodiment, a system includes a high compressor of a gas turbine engine having a ratio of a cold-rotor build clearance to a span between 0.7% and 7%. The cold-rotor build clearance is defined for a plurality of rotor blades of the high compressor with respect to an engine casing assembly interior surface of the high compressor, and the span is defined as a gap between a rotor disk of the high compressor and the engine casing assembly interior surface of the high compressor for at least a last two stages of the high compressor closest to a combustor section of the gas turbine engine. The system also includes at least two bowed rotor management systems for the gas turbine engine to prevent damage to the rotor blades for a bowed rotor condition of the high compressor under a plurality of operating conditions.

In addition to one or more of the features described above, or as an alternative to any of the foregoing embodiments, further embodiments may include where at least one of the at least two bowed rotor management systems comprises a rotor abrasion system including abrasive blade tips on the rotor blades of the high compressor and one or more rub strips on the engine casing assembly interior surface.

In addition to one or more of the features described above, or as an alternative to any of the foregoing embodiments, further embodiments may include where at least one of the at least two bowed rotor management systems comprises a core-turning motor system.

In addition to one or more of the features described above, or as an alternative to any of the foregoing embodiments, further embodiments may include where at least one of the at least two bowed rotor management systems comprises a dry motoring system.

In addition to one or more of the features described above, or as an alternative to any of the foregoing embodiments, further embodiments may include where at least one of the at least two bowed rotor management systems comprises a multi-engine dry motoring coordination system.

In addition to one or more of the features described above, or as an alternative to any of the foregoing embodiments, further embodiments may include where at least one of the at least two bowed rotor management systems comprises a damper system operable to maintain a minimum running clearance between the rotor blades of the high compressor and the engine casing assembly interior surface across a critical rotor speed range of the high compressor including a resonant frequency of the high compressor with an oil pressure above 25 pounds per square inch gage.

In addition to one or more of the features described above, or as an alternative to any of the foregoing embodiments, further embodiments may include where the at least two bowed rotor management systems comprise a combination of: a rotor abrasion system, a core-turning motor system, a dry motoring system, a multi-engine dry motoring coordination system, and a damper system operable to maintain a minimum running clearance between the rotor blades of the high compressor and the engine casing assembly interior surface across a critical rotor speed range of the high compressor including a resonant frequency of the high compressor with an oil pressure above 25 pounds per square inch gage.

In addition to one or more of the features described above, or as an alternative to any of the foregoing embodiments, further embodiments may include a controller operable to determine a status of the bowed rotor condition of the high compressor, where the controller is operable to select between use of the at least two bowed rotor management systems based on the status of the bowed rotor condition of the high compressor or a condition external to the gas turbine engine.

In addition to one or more of the features described above, or as an alternative to any of the foregoing embodiments, further embodiments may include where a mitigation monitor is operable to sequence use of the at least two bowed rotor management systems, restart use of one or more of the at least two bowed rotor management systems, and trigger a maintenance request based on a detected bowed rotor elimination fault condition.

In addition to one or more of the features described above, or as an alternative to any of the foregoing embodiments, further embodiments may include where a ratio of the cold-rotor build clearance to a rotor diameter of the high compressor is between 0.02% and 0.3%, and a ratio of the cold-rotor build clearance to a chord of the rotor blades of the high compressor is between 0.5% and 5%.

According to another embodiment, a method includes executing a bowed rotor mitigation process on a gas turbine engine using at least one bowed rotor management system, the gas turbine engine comprising a high compressor having a ratio of a cold-rotor build clearance to a span between 0.7% and 7%. The cold-rotor build clearance is defined for a plurality of rotor blades of the high compressor with respect to an engine casing assembly interior surface of the high compressor, and the span is defined as a gap between a rotor disk of the high compressor and the engine casing assembly interior surface of the high compressor for at least a last two stages of the high compressor closest to a combustor section of the gas turbine engine. At least two bowed rotor management systems for the gas turbine engine are provided to prevent damage to the rotor blades for a bowed rotor condition of the high compressor under a plurality of operating conditions.

In addition to one or more of the features described above, or as an alternative to any of the foregoing embodiments, further embodiments may include configuring a controller to determine a status of the bowed rotor condition of the high compressor and select between use of the at least two bowed rotor management systems based on the status of the bowed rotor condition of the high compressor or a condition external to the gas turbine engine.

In addition to one or more of the features described above, or as an alternative to any of the foregoing embodiments, further embodiments may include configuring a mitigation monitor to sequence use of the at least two bowed rotor management systems, restart use of one or more of the at least two bowed rotor management systems, and trigger a maintenance request based on a detected bowed rotor elimination fault condition.

A technical effect of the apparatus, systems and methods provide multiple bowed rotor management systems for a gas turbine engine that enable a high compressor build clearance reduction in the gas turbine engine to increase compressor stability and reduce fuel burn as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
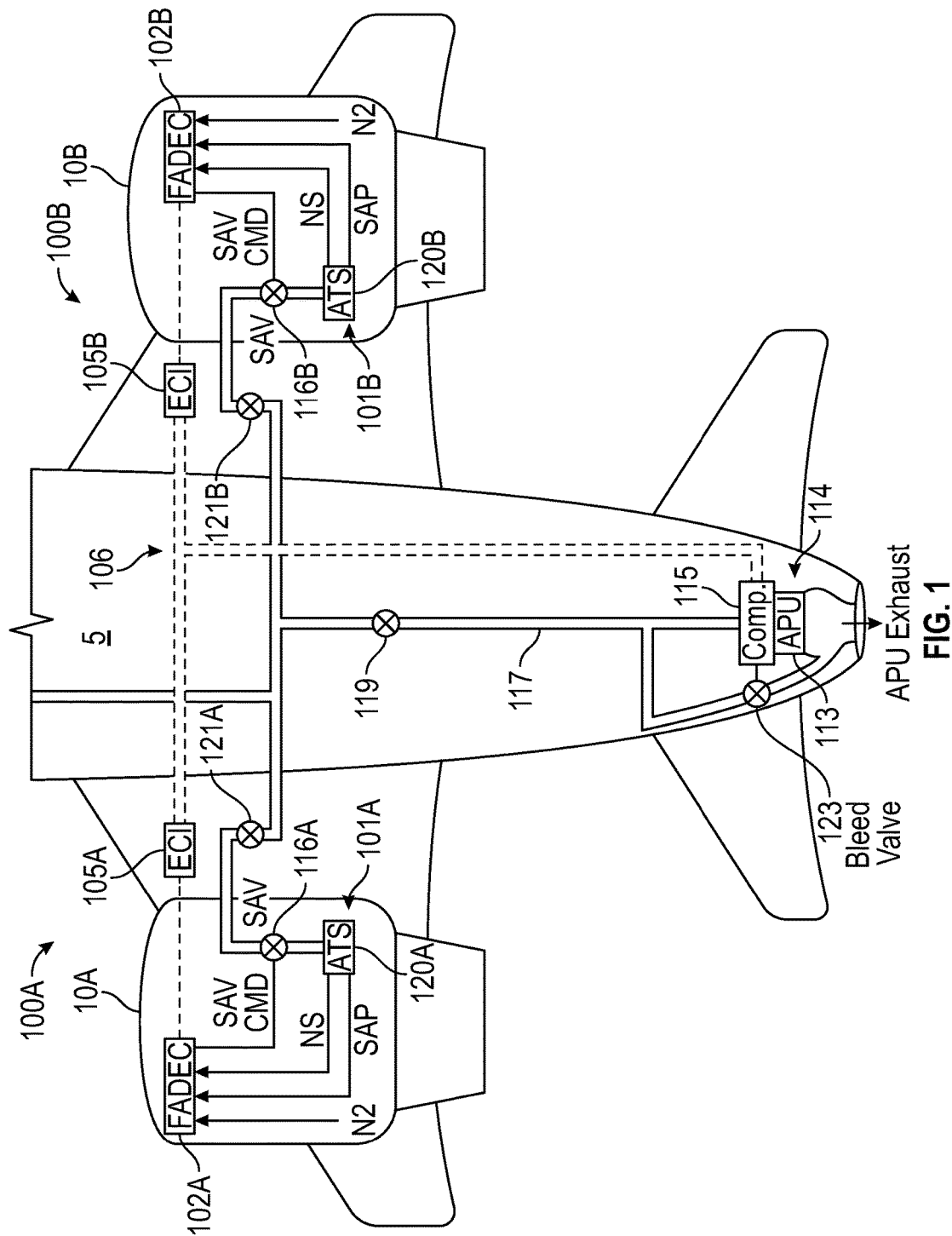
FIG. 1 is a schematic illustration of an aircraft engine starting system in accordance with an embodiment of the disclosure.

Various embodiments of the present disclosure are related to high compressor build clearance reduction in a gas turbine engine by using at least two bowed rotor management systems for the gas turbine engine to prevent damage to rotor blades for a bowed rotor condition of the high compressor under a plurality of operating conditions. If a bowed rotor condition is not prevented or successfully mitigated, engine damage may result from rubbing of rotor blades against an engine case during a bowed rotor condition. Rather than opening a cold-rotor build clearance of the high compressor to accommodate bowed rotor effects, the combination of two or more bowed rotor management systems accommodate a variety of operating conditions and may also be used for redundancy in case one of the bowed rotor management systems fails or is ineffective under certain conditions. The high reliability of the combination of two or more bowed rotor management systems reduces the risk of engine damage due to a bowed rotor condition and thus can enable tighter build clearances to improve compressor efficiency and reduce fuel burn. In embodiments, rather than incorporating a cold-rotor build clearance of 50 mils or more, the cold-rotor build clearance can be safely reduced. The running clearance can vary due to temperature, vibration, and/or rotational speed changes while the engine is operating.

Embodiments can use any combination of a rotor abrasion system, a core-turning motor system, a damper system, a dry motoring system, and/or a multi-engine dry motoring coordination system as bowed rotor management systems to prevent or mitigate a bowed rotor condition as further described herein. For example, a rotor abrasion system can be used to grind down one or more rub strips formed of a semi-solid material on the engine casing assembly interior surface using abrasive blade tips on the rotor blades of the high compressor. The grinding effects may be limited in the amount of material removed from the rub strips and can serve as a backup protection system in the event that other bowed rotor management systems are not fully effective in timely reducing a bowed rotor condition to a level that prevents any rubbing contact with rotor blades. A core-turning motor system can use a dedicated core turning motor to rotate the high compressor to prevent or reduce a bowed rotor condition. A damper system can be tuned to limit excessive vibration amplitude caused by a bowed rotor condition. A dry motoring system can use the existing starting system of the gas turbine engine to turn the high compressor for an extended period of time prior to ignition during an engine starting process. A multi-engine dry motoring coordination system can schedule or respond to bowed rotor prevention/mitigation actions between multiple engines of an aircraft though monitoring a shared power source, monitoring actions or scheduled actions of multiple engines, and/or incorporating control laws that dynamically adjust for power source fluctuations attributable to multi-engine bowed rotor prevention/mitigation actions.

In some embodiments, a core turning motor may rotate an engine core (e.g., starting spool/N2) of the gas turbine engine at about 0.1 revolutions per minute (RPM) with a gear reduction (e.g., greater than 100:1) by applying substantially constant power (i.e., not periodic) for a period of time. Alternatively, the core turning motor may rotate the starting spool for a partial rotation periodically based on rotation time or reaching a sensed position (e.g., about 180 degrees of rotation per interval). The core turning motor can include a feedback device, depending on the type of motor selected, to monitor electric current, back electromotive force, torque, and/or other parameters. If the core-turning motor system does not sufficiently reduce a bowed rotor condition, one or more alternate bowed rotor management systems can be used to mitigate the bowed rotor condition, such as dry motoring and/or a rotor abrasion system. Dry motoring can also be used if the engine is started before the core turning motor is shutdown. For instance, if it is determined that the core turning motor has not been run for a sufficient period of time to prevent a bowed rotor condition, dry motoring can be used.

The core turning motor can rotate turbomachinery of the gas turbine engine at low speeds (e.g. less than 5000 RPM) or at very low speed (e.g., <5 revolutions per minute (RPM)) in order to equalize the thermal gradient of the rotating parts after engine shutdown. The core turning motor can interface through any of the gear-driven accessories of the engine, such as an air turbine starter or a crank pad location. The power requirements of the core turning motor are substantially reduced in that the rotation needed to equalize the thermal gradients may be on the order of less than 3 RPM. Upon engine shutdown, the core turning motor can be controlled to rotate the turbomachinery, e.g., a high pressure spool of the gas turbine engine, for a predetermined period of time (30-40 minutes, for example) or as a function of one or more parametric values such as a measured temperature. By slow and/or periodic rotation of the turbomachinery, the thermal gradient is avoided, and thus a bow condition is prevented/eliminated.

Embodiments avoid high speed rotation (e.g., 5000-7000 RPM) of the engine after shutdown and also avoid requiring a flight crew to monitor the temperature of each engine of a multi-engine aircraft for several minutes prior to restarting each engine. Rather than using a ground cart or other external source to drive engine rotation (e.g., an external pneumatic system) or an auxiliary power unit of the aircraft that is typically used to rotate turbomachinery of the engine at a starting speed, embodiments can use an electric motor as the core turning motor operable to slowly rotate (e.g., <5 RPM) the turbomachinery after engine shutdown. Embodiments of the core turning motor can be dedicated for use in bowed rotor prevention, and as such, sized with a lower weight and volume than would be needed to drive rotation of the engine at or above an engine starting speed. Gear reductions can be used to reduce electric power consumption.

Embodiments can also or alternatively include using a starter air valve to control a rotor speed of a starting spool of a gas turbine engine to mitigate a bowed rotor condition using a dry motoring process for one or more engines. During dry motoring, the starter air valve can be actively adjusted to deliver air pressure (i.e., compressed air) from an air supply to an air turbine starter of an engine starting system that controls starting spool rotor speed. Dry motoring may be performed by running an engine starting system at a lower speed with a longer duration than typically used for engine starting while dynamically adjusting the starter valve to maintain the rotor speed and/or follow a dry motoring profile. Dry motoring is typically performed at a higher speed than bowed rotor prevention performed by the core turning motor. Some embodiments increase the rotor speed of the starting spool to approach a critical rotor speed gradually and as thermal distortion is decreased the starting spool then accelerates beyond the critical rotor speed to complete the engine starting process. The critical rotor speed refers to a major resonance speed (i.e., a resonant frequency) where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

A dry motoring profile for dry motoring can be selected based on various parameters, such as a modeled temperature value of the gas turbine engine used to estimate heat stored in the engine core when a start sequence is initiated and identify a risk of a bowed rotor. The modeled temperature value alone or in combination with other values (e.g., measured temperatures) can be used to calculate a bowed rotor risk parameter. For example, the modeled temperature can be adjusted relative to an ambient temperature when calculating the bowed rotor risk parameter. The bowed rotor risk parameter may be used to take a control action to mitigate the risk of starting the gas turbine engine with a bowed rotor. The control action can include dry motoring consistent with the dry motoring profile. In some embodiments, a targeted rotor speed profile of the dry motoring profile can be adjusted as dry motoring is performed. The dry motoring profile can be configured to oscillate the motoring speed in an alternating pattern between multiple engines such that rotor speed of each engine stays below the critical rotor speed while not completely stopping rotation during dry motoring. For instance, in a two engine system, the motoring systems alternate between receiving more compressed air and less compressed air in a staggered pattern such that one engine is accelerating while the other engine is decelerating to reduce loading on a compressed air source that drives the motoring of both engines. In some embodiments, each engine has a baseline dry motoring profile that can be time shifted on an engine basis to achieve an alternating pattern. Dry motoring profiles can be formatted on a rotor speed basis (e.g., N2), a starter speed basis (e.g., NS), a valve position basis, and/or using one or more other control parameters.

In alternate embodiments, electric starters are used in motoring systems to perform dry motoring. The electric starters may alternate in drawing electric current from an electric power source such that one engine is accelerating while the other engine is decelerating to reduce loading on the electric power source that drives the motoring of both engines. Dry motoring profiles can be defined on an electrical current draw basis.

A full authority digital engine control (FADEC) system or other system may send a message to the cockpit to inform the crew of an extended time start time due to bowed rotor mitigation actions prior to completing an engine start sequence. If an engine is in a ground test or in a test stand, a message can be sent to the test stand or cockpit based on the control-calculated risk of a bowed rotor. A test stand crew can be alerted regarding a requirement to keep the starting spool of the engine to a speed below the known resonance speed of the rotor in order to homogenize the temperature of the rotor and the casings about the rotor which also are distorted by temperature non-uniformity.

In order to further reduce total start time, embodiments can control dry motoring of multiple engines at the same time using additional control features as part of a multi-engine dry motoring coordination system. Respective FADECs for each engine can provide parameters to one or more engine control interfaces including sensed temperatures and other values that may impact timing decisions for starter use for each engine. An engine control interface that receives the parameters can determine present conditions with respect to an operating envelope of a power source (e.g., compressed air or electric) and the starting system of each engine based on predetermined performance constraints, engine drag, and/or parasitic factors.

Various embodiments of this disclosure may be applied on any turbomachinery component that requires cooling after shutdown. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Referring now to FIG. 1, a schematic illustration of an aircraft 5 is depicted with a pair of engine systems 100A, 100B. Engine systems 100A, 100B include gas turbine engines 10A, 10B and engine starting systems 101A, 101B respectively. Engine systems 100A, 100B also include FADECs 102A, 102B to control gas turbine engines 10A, 10B and engine starting systems 101A, 101B. FADECs 102A, 102B may generally be referred to as controllers. FADECs 102A, 102B can communicate with respective engine control interfaces 105A, 105B using a digital communication bus 106. The engine control interfaces 105A, 105B can buffer engine system communication from aircraft level communication. Although depicted separately in FIG. 1, in some embodiments the engine control interfaces 105A, 105B are integrated with the FADECs 102A, 102B. The engine control interfaces 105A, 105B may also be referred to as controllers when configured to make mode selection determinations to perform single engine or multi-engine dry motoring for the aircraft 5.

In an embodiment, the FADECs 102A, 102B and engine control interfaces 105A, 105B may each include memory to store instructions that are executed by one or more processors on one or more channels. The executable instructions may be stored or organized in any manner and at any level of abstraction, such as in connection with a controlling and/or monitoring operation of the gas turbine engines 10A, 10B of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

In the example of FIG. 1, an auxiliary power unit (APU) 113 and compressor 115 provide a compressed air source 114 to drive air turbine starters 120A, 120B of engine starting systems 101A, 101B. The APU 113 can also produce electric power. Compressed air from the compressed air source 114 is routed through ducts 117 and air starter valves 116A, 116B to the air turbine starters 120A, 120B. Various shutoff valves can also be included in ducts 117, such as a main shutoff valve 119 and engine shutoff valves 121A, 121B. One or more bleed valves 123 can be used to release compressed air from the ducts 117. According to an alternate embodiment, the compressed air source 114 may be a ground cart, cross engine bleed or other source of air.

In some cases, dry motoring can be performed simultaneously for engine systems 100A, 100B, where compressed air from the compressed air source 114 is provided to both air turbine starters 120A, 120B. The FADECs 102A, 102B and/or the engine control interfaces 105A, 105B can be configured with control laws to control a motoring speed for each of the gas turbine engines 10A, 10B and maintain the motoring speed below a threshold level (i.e., the critical rotor speed) for the engine system 100A, 100B while performing dry motoring based on compressed air source 114. In embodiments, FADECs 102A, 102B can observe various engine parameters and starting system parameters to actively control dry motoring and prevent fault conditions from damaging the gas turbine engines 10A, 10B. For example, FADECs 102A, 102B can observe engine speeds (N2) of gas turbine engines 10A, 10B and may receive starter system parameters such as starter speeds (NS) and/or starter air pressures (SAP). In embodiments, FADECs 102A, 102B can adjust starter air valves 116A, 116B based on commands received from the engine control interfaces 105A, 105B to balance loading on the compressed air source 114. The total motoring time for gas turbine engines 10A, 10B can be synchronized such that motoring is performed for a same amount of time for both gas turbine engines 10A, 10B in a pre-start motoring sequence.

To further enhance control aspects, the FADECs 102A, 102B can provide either or both of the engine control interfaces 105A, 105B with engine data including parameters that directly or indirectly modify an aspect of the compressed air received at the starter air valves 116A, 116B. Engine data can be sent on the digital communication bus 106 to either or both of the engine control interfaces 105A, 105B to make relative timing control determinations. Engine data can also or alternatively be exchanged on an alternate link (e.g., cross engine bus 106A of FIG. 2) between FADECs 102A, 102B for relative timing control. Engine data may include fault information, such as a detected failure of the starter air valves 116A, 116B and/or the air turbine starters 120A, 120B. Present condition information and/or commands included in the engine data can allow the engine control interfaces 105A, 105B to track and/or predict events that will impact available compressed air for dry motoring at each of the engine starting systems 101A, 101B. For example, at least one temperature of gas turbine engines 10A, 10B, such as a measured core engine temperature or an oil temperature, can be used to determine current conditions and select timing parameters shared by the two or more engines 10A, 10B. Additional performance parameters, such as an ambient air temperature and/or an ambient pressure, can also be used to determine relative control timing between two or more engines 10A, 10B. For instance, ambient temperature can be used for temperature comparison/normalization and ambient pressure can be used to adjust for altitude effects. When sufficient margin is present, a greater amount of overlap may be commanded where both starter air valves 116A, 116B are simultaneously open. Where reduced compressed air source capacity is available, only one of the starter air valves 116A, 116B may be open at a time while motoring is active.

Although FIG. 1 depicts one example configuration, it will be understood that embodiments as described herein can cover a wide range of configurations, such as a four engine system. Further, the compressed air source 114 can include multiple sources other than APU 113 and compressor 115, such as a ground cart or cross engine bleed air. The compressed air source 114 is an example of a power source for engine starting systems 101A, 101B. In alternate embodiments, a power source can be electric power when electric starters are used in place of air turbine starters 120A, 120B.

Figure 2:
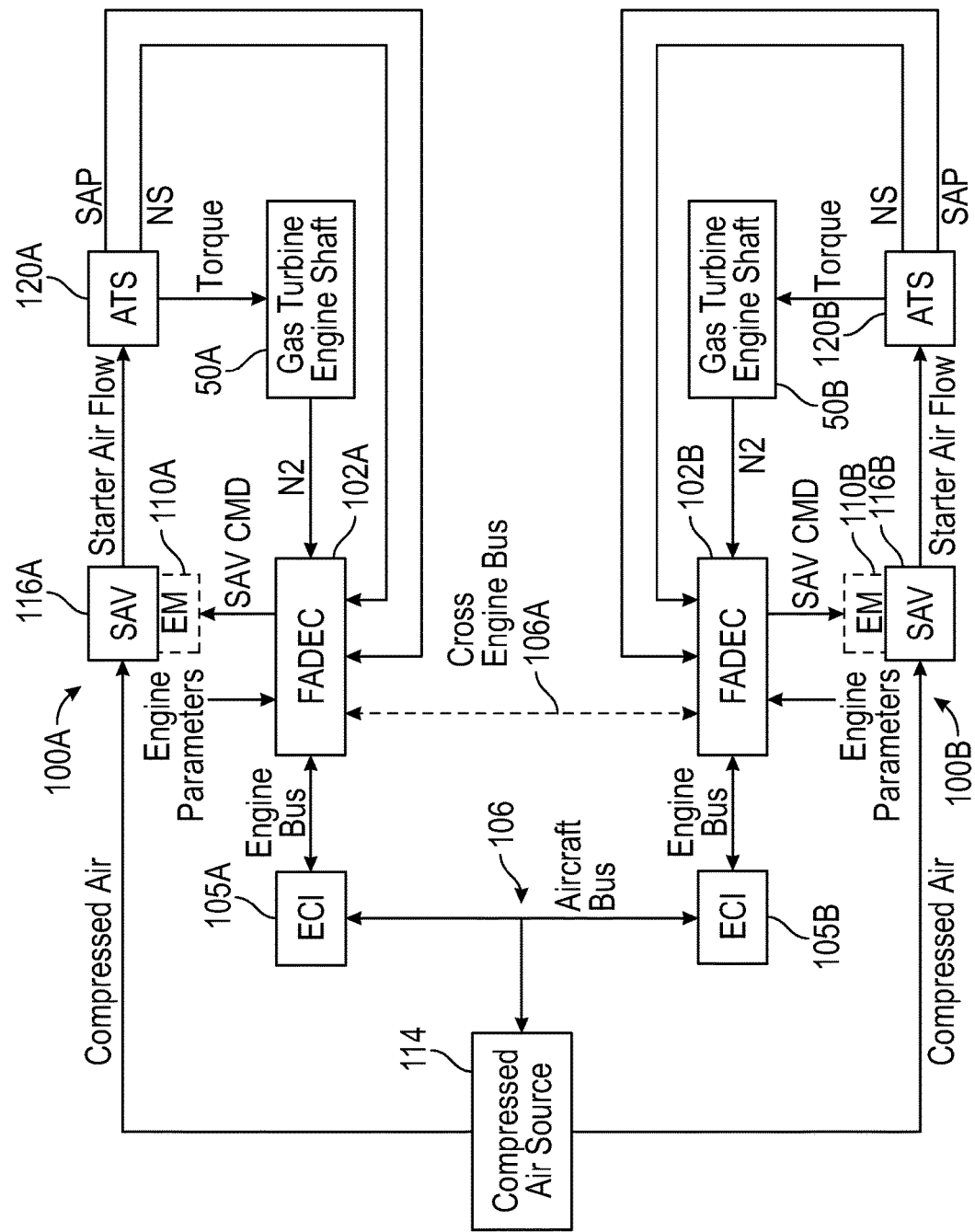
FIG. 2 is another schematic illustration of an aircraft engine starting system in accordance with an embodiment of the disclosure.

Turning now to FIG. 2, a schematic of engine systems 100A, 100B and engine starting systems 101A, 101B for the gas turbine engines 10A, 10B of FIG. 1 are depicted according to an embodiment. In the example of FIG. 2, the digital communication bus 106 can include an aircraft, engine, and/or test stand communication bus to interface with FADECs 102A, 102B, engine control interfaces 105A, 105B, aircraft controls, e.g., a cockpit, various onboard computer systems, and/or a test stand (not depicted). In some embodiments, a cross engine bus 106A provides a link between FADECs 102A, 102B as a lower latency communication path between engine systems 100A, 100B, for instance, by avoiding shared communication scheduling conflicts with other aircraft level systems. Either or both channels of FADECs 102A, 102B can drive on and off commands to respective electromechanical devices 110A, 110B coupled to starter air valves 116A, 116B to achieve a partially open position of the starter air valves 116A, 116B to control a flow of compressed air from compressed air source 114 (e.g., APU 113 and compressor 115 of FIG. 1) as a starter air flow to air turbine starters 120A, 120B during dry motoring. The air turbine starters 120A, 120B output torque to drive rotation of respective gas turbine engine shafts 50A, 50B of starting spools of the gas turbine engines 10A, 10B.

The FADECs 102A, 102B can monitor engine speed (N2), starter speed (NS), starter air pressure (SAP), and/or other engine parameters to determine an engine operating state and control the starter air valves 116A, 116B. Thus, the FADECs 102A, 102B can each establish a control loop with respect to a motoring speed (N2 and/or NS) and/or starter air pressure to adjust positioning of the starter air valves 116A, 116B. The FADECs 102A, 102B can also transmit engine data on digital communication bus 106 to engine control interfaces 105A, 105B, including present conditions and commands of each engine system 100A, 100B that may impact characteristics of the compressed air available at the starter air valves 116A, 116B. The engine control interfaces 105A, 105B can supply the FADECs 102A, 102B with coordination commands to adjust timing of the FADECs 102A, 102B such that motoring time is the same for both engines 10A, 10B regardless of whether motoring is performed simultaneously or sequentially.

In some embodiments, the starter air valves 116A, 116B are discrete valves designed as on/off valves that are typically commanded to either fully opened or fully closed. However, there is a time lag to achieve the fully open position and the fully closed position. By selectively alternating an on-command time with an off-command time through the electromechanical devices 110A, 110B, intermediate positioning states (i.e., partially opened/closed) can be achieved. The FADECs 102A, 102B can modulate the on and off commands (e.g., as a duty cycle using pulse width modulation) to the electromechanical devices 110A, 110B to further open the starter air valves 116A, 116B and increase a rotational speed of the gas turbine engine shafts 50A, 50B. In an embodiment, the electromechanical devices 110A, 110B have a cycle time defined between an off-command to an on-command to the off-command that is at most half of a movement time for the starter air valves 116A, 116B to transition from fully closed to fully open. Pneumatic lines or mechanical linkage (not depicted) can be used to drive the starter air valves 116A, 116B between the open position and the closed position. The electromechanical devices 110A, 110B can each be a solenoid that positions the starter air valves 116A, 116B based on intermittently supplied electric power as commanded by the FADECs 102A, 102B. In an alternate embodiment, the electromechanical devices 110A, 110B are electric valves controlling muscle air to adjust the position of the starter air valves 116A, 116B as commanded by the FADECs 102A, 102B.

In an alternate embodiment, rather than using electromechanical devices 110A, 110B to achieve a partially open position of the starter air valves 116A, 116B, the starter air valves 116A, 116B can be variable position valves that are dynamically adjustable to selected valve angles by the FADECs 102A, 102B. When implemented as variable position valves, the starter air valves 116A, 116B can be continuous/infinitely adjustable and hold a commanded valve angle, which may be expressed in terms of a percentage open/closed and/or an angular value (e.g., degrees or radians). Performance parameters of the starter air valves 116A, 116B can be selected to meet dynamic response requirements. For example, in some embodiments, the starter air valves 116A, 116B each have a response rate of 0% to 100% open in less than 40 seconds. In other embodiments, the starter air valves 116A, 116B each have a response rate of 0% to 100% open in less than 30 seconds. In further embodiments, the starter air valves 116A, 116B each have a response rate of 0% to 100% open in less than 20 seconds.

In some embodiments, the FADECs 102A, 102B can each monitor a valve angle of the starter air valves 116A, 116B when valve angle feedback is available. The FADECs 102A, 102B can establish an outer control loop with respect to motoring speed and an inner control loop with respect to the valve angle of the starter air valves 116A, 116B. Valve angle feedback and/or valve commands can be included in the cross engine data exchanged between the FADECs 102A, 102B and may be sent to the engine control interfaces 105A, 105B. In some embodiments, the engine control interfaces 105A, 105B establish a further outer control loop that adjusts timing of control actions of the FADECs 102A, 102B relative to each other.

Figure 3:
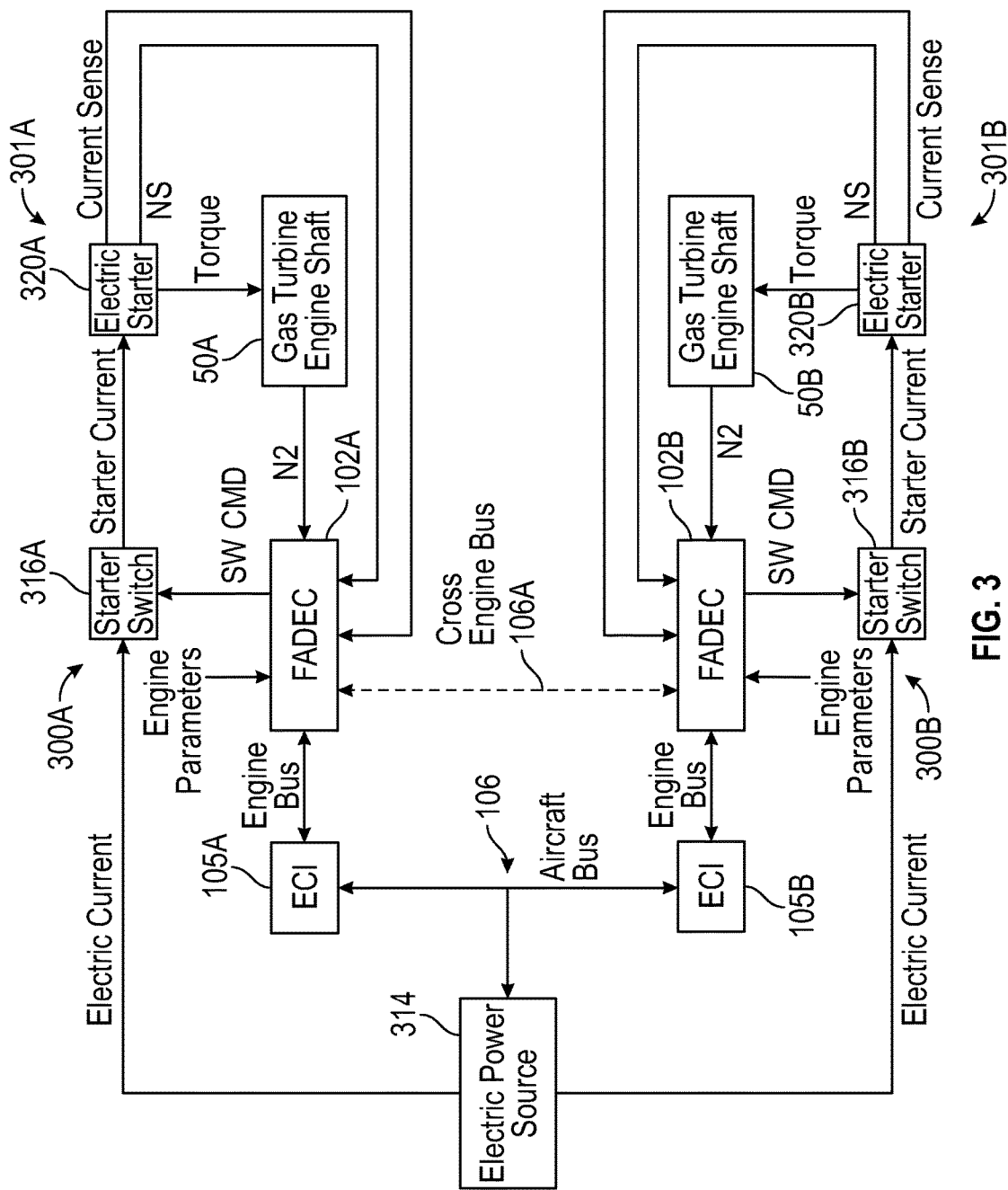
FIG. 3 is another schematic illustration of an aircraft engine starting system in accordance with an embodiment of the disclosure.

As a further alternative, FIG. 3 depicts a schematic of engine systems 300A, 300B and engine starting systems 301A, 301B for the gas turbine engines 10A, 10B of FIG. 1 according to an embodiment. In the example of FIG. 3, either or both channels of FADECs 102A, 102B can drive on and off commands to respective starter switches 316A, 316B to control a flow of electric current from electric power source 314 (e.g., electricity generated by APU 113 of FIG. 1, a stored energy source, a cross engine power supply, ground power, etc.) as a starter current to electric starters 320A, 320B during dry motoring. The electric starters 320A, 320B output torque to drive rotation of respective gas turbine engine shafts 50A, 50B of starting spools of the gas turbine engines 10A, 10B.

The FADECs 102A, 102B can monitor engine speed (N2), starter speed (NS), current, and/or other engine parameters to determine an engine operating state and control the starter switches 316A, 316B. Thus, the FADECs 102A, 102B can each establish a control loop with respect to a motoring speed (N2 and/or NS) and/or current to adjust the state of the starter switches 316A, 316B. The FADECs 102A, 102B can also transmit engine data on digital communication bus 106 to engine control interfaces 105A, 105B, including present conditions and commands of each engine system 100A, 100B that may impact characteristics of the electric current available at the starter switches 316A, 316B. The engine control interfaces 105A, 105B can supply the FADECs 102A, 102B with coordination commands to adjust timing between the FADECs 102A, 102B such that motoring time is the same for both engines 10A, 10B regardless of whether motoring is performed simultaneously or sequentially.

Figure 4:
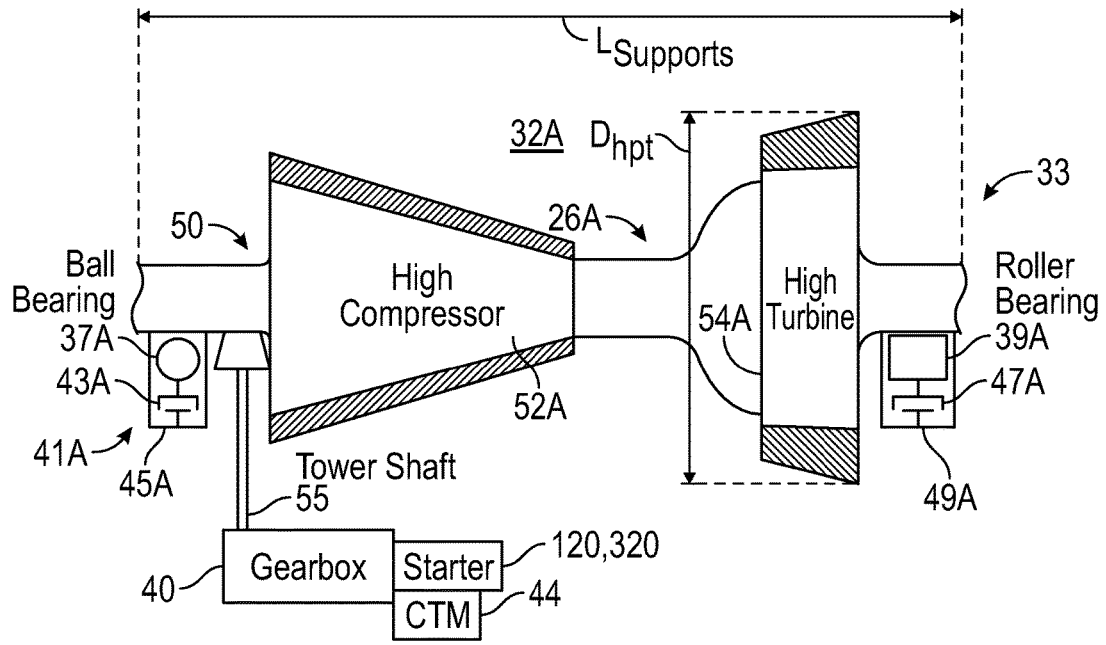
FIG. 4 is a schematic illustration of a high spool gas path with a straddle-mounted spool in accordance with an embodiment of the disclosure.
Figure 5:
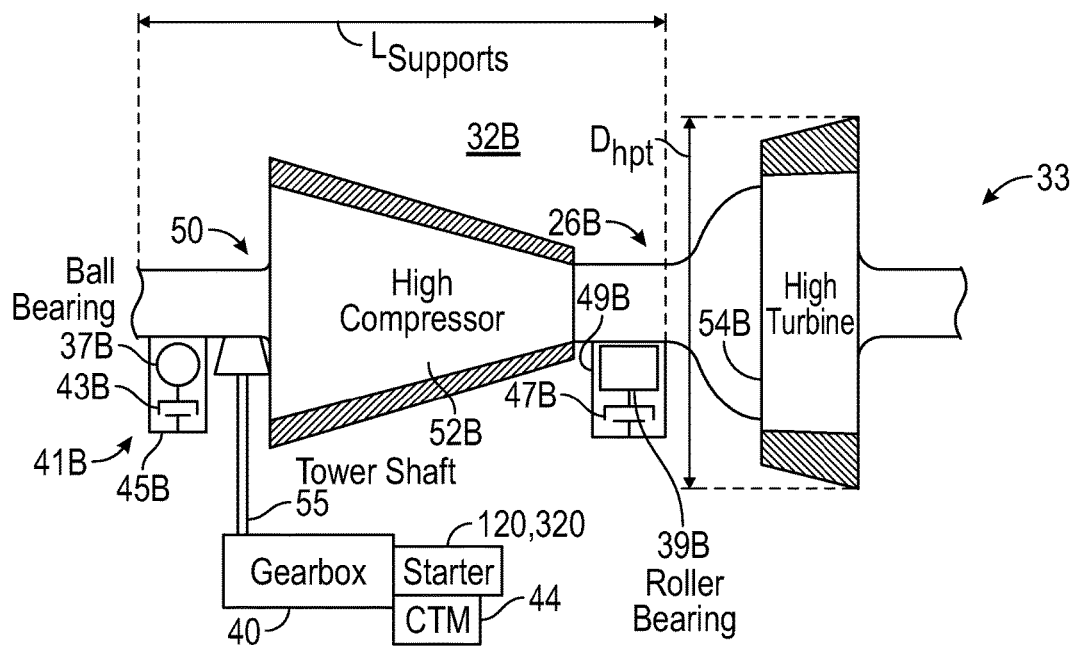
FIG. 5 is a schematic illustration of a high spool gas path with an overhung spool in accordance with an embodiment of the disclosure.

FIGS. 4 and 5 depict two example engine configurations of the gas turbine engines 10A, 10B of FIG. 1. FIG. 4 is an example of a straddle-mounted spool 32A as a starting spool configuration, generally referred to as a high spool 33. The straddle-mounted spool 32A spans a combustor section 26A between a high pressure compressor 52A and a high pressure turbine 54A. This configuration places two bearing compartments 37A and 39A (which may include a ball bearing and a roller bearing respectively), outside of the plane of most of the compressor disks of high pressure compressor 52A and at outside at least one of the turbine disks of high pressure turbine 54A. In contrast with a straddle-mounted spool arrangement, other embodiments may be implemented using an over-hung mounted spool 32B as depicted in FIG. 5 as a starting spool configuration, generally referred to as a high spool 33. The over-hung mounted spool 32B spans a combustor section 26B between a high pressure compressor 52B and a high pressure turbine 54B. In over-hung mounted spool 32B, a bearing compartment 37B is located forward of the first turbine disk of high pressure turbine 54B such that the high pressure turbine 54B is overhung, and it is physically located aft of its main supporting structure. The use of straddle-mounted spools has advantages and disadvantages in the design of a gas turbine, but one characteristic of the straddle-mounted design is that the span between the bearing compartments 37A and 39A is long, making the amplitude of the high spot of a bowed rotor greater and the resonance speed that cannot be transited prior to temperature homogenization is lower. For any thrust rating, the straddle mounted arrangement, such as straddle-mounted spool 32A, gives Lsupport/Dhpt values that are higher, and the over-hung mounted arrangement, such as overhung spool 32B, can be as much as 60% of the straddle-mounted Lsupport/Dhpt. Lsupport is the distance between bearings (e.g., between bearing compartments 37A and 39A or between bearing compartments 37B and 39B), and Dhpt is the diameter of the last blade of the high pressure turbine (e.g., high pressure turbine 54A or high pressure turbine 54B). As one example, a straddle-mounted engine starting spool, such as straddle-mounted spool 32A, with a roller bearing at bearing compartment 39A located aft of the high pressure turbine 54A may be more vulnerable to bowed rotor problems since the Lsupport/Dhpt ranges from 1.9 to 5.6.

FIGS. 4 and 5 also illustrate a starter as an air turbine starter 120 (e.g., air turbine starter 120A or 120B of FIGS. 1 and 2) or electric starter 320 (e.g., electric starter 320A or 320B of FIG. 3) interfacing through gearbox 40 via a tower shaft 55 with the straddle-mounted spool 32A proximate high compressor 52A and interfacing via tower shaft 55 with the overhung mounted spool 32B proximate high compressor 52B as part of a starting system. The straddle-mounted spool 32A and the over-hung mounted spool 32B are both examples of a starter spool having a gas turbine engine shaft 50 driven by the starter 120, 320, such as gas turbine engine shafts 50A, 50B driven by air turbine starters 120A, 120B of FIG. 2 or electric starters 320A, 320B of FIG. 3. In some embodiments, a core turning motor 44 is operable to drive rotation of the straddle-mounted spool 32A or the over-hung mounted spool 32B through gearbox 40 as part of a core-turning motor system. The core turning motor 44 may be coupled through a transmission (e.g., transmission 154 of FIG. 7) and/or integrated with an accessory, such as the starter 120, 320.

Figure 11:
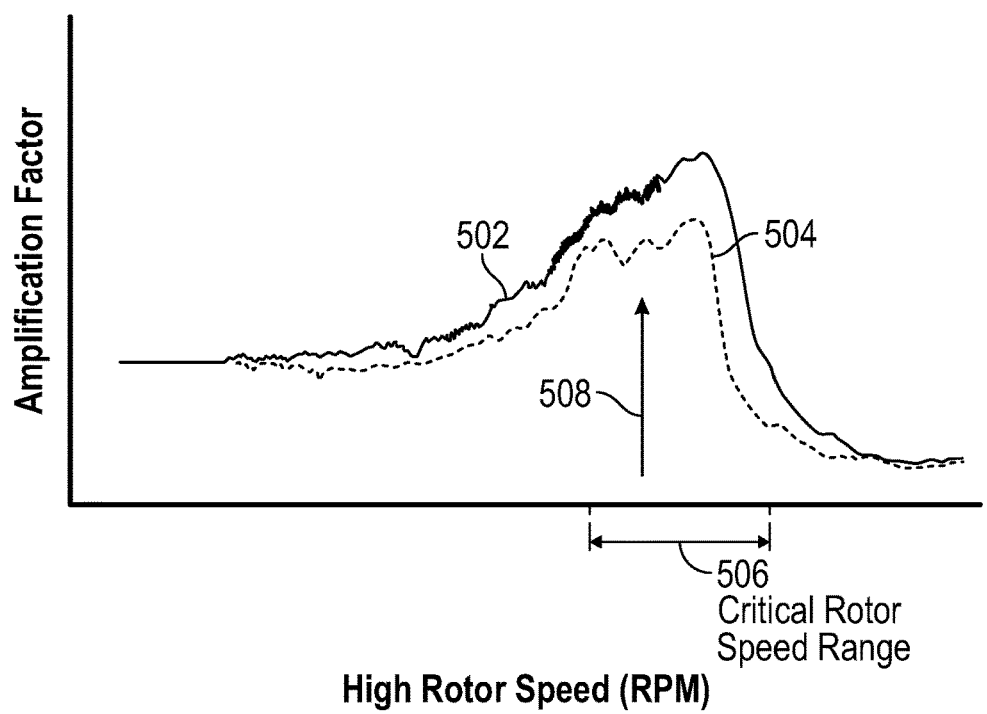
FIG. 11 depicts damper system effects in accordance with an embodiment of the disclosure.

In some embodiments, a damper system 41A can include a damper 43A incorporated in a ball bearing housing 45A of ball bearing 37A and/or a damper 47A incorporated in a roller bearing housing 49A of roller bearing 39A. Similarly, a damper system 41B can include a damper 43B incorporated in a ball bearing housing 45B of ball bearing 37B and/or a damper 47B incorporated in a roller bearing housing 49B of roller bearing 39B. The dampers 43A, 43B, 47A, 47B can be optimized to reduce vibration amplitude at a resonant frequency where the combination of a bowed rotor and similarly bowed casing and the resonance may lead to high amplitude oscillation in the rotor and high rubbing of blade tips on one side of the rotor. The dampers 43A, 43B, 47A, 47B can be optimized by controlling gaps and fluid pressures under various operating conditions. Vibration during engine operation can be characterized as an amplification factor that can alter a running clearance of the high pressure compressor 52A, 52B at different speeds. As depicted in the example of FIG. 11, a baseline amplification factor 502 over a range of rotor speeds can increase across a critical rotor speed range 506 of the high pressure compressor 52A, 52B including a resonant frequency 508 of the high pressure compressor 52A, 52B. The dampers 43A, 43B, 47A, 47B can be optimized to a reduced amplification factor 504 across the critical rotor speed range 506 to maintain a minimum running clearance between the rotor blades of the high pressure compressor 52A, 52B and the engine casing assembly interior surface.

Figure 12:
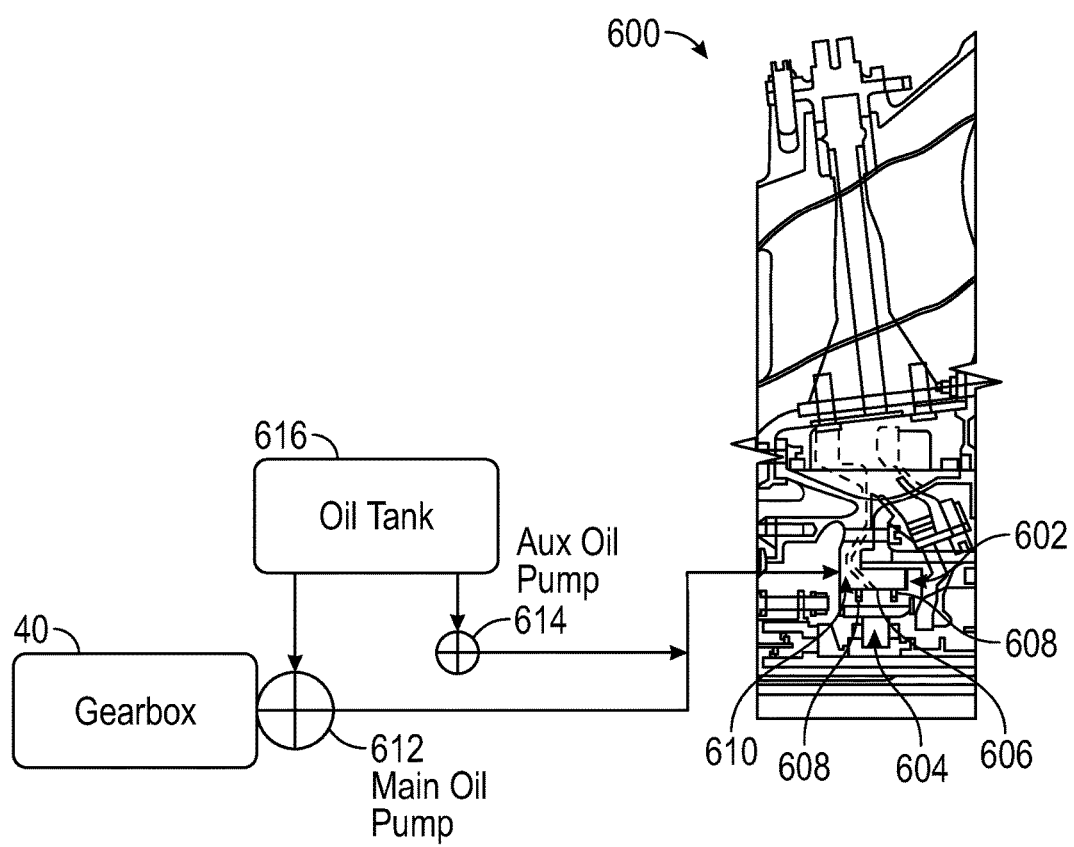
FIG. 12 depicts a damper system in accordance with an embodiment of the disclosure.

The dampers 43A, 43B, 47A, 47B of FIGS. 4 and 5 may be implemented as further described and depicted with respect to FIG. 12. FIG. 12 depicts one example of a damper system 600 that can supply hydraulic fluid, such as oil, to one or more damper 602, e.g., the dampers 43A, 43B, 47A, 47B of FIGS. 4 and 5. In the example of FIG. 12, the damper 602 is located proximate to a bearing race 604 and formed as an oil-pressure cavity 606 between piston rings 608. An oil passage 610 supplies pressurized oil to dampen vibrations that may be associated with normal engine operation and/or a bowed rotor condition. During normal operation when a main oil pump 612 coupled to gearbox 40 is turning at a sufficiently high rate, pressurized oil is delivered, for instance, from an oil tank 616 to the oil passage 610. Since a resonant frequency of the high compressor 52A, 52B can occur below a normal operating range where the main oil pump 612 can produce sufficient damping pressure, an auxiliary pump 614, such as an electric oil pump, provides a boosted pressure to the oil passage 610. As one example, the auxiliary oil pump 614 separately or in combination with the main oil pump 612 provides the damper 602 with an oil pressure above 25 pounds per square inch gage to maintain a minimum running clearance between the rotor blades of the high compressor 52A, 52B and the engine casing assembly interior surface across a critical rotor speed range of the high compressor 52A, 52B including a resonant frequency of the high compressor 52A, 52B. In other embodiments, the main oil pump 612 can include one or more additional pump stages as the auxiliary pump 614. Other approaches to achieving the desired oil pressure during a bowed rotor condition can include the use of valves (not depicted) to concentrate oil flow to the oil passage 610 rather than allowing the oil to circulate to other subsystems across a critical rotor speed range of the high compressor 52A, 52B including a resonant frequency of the high compressor 52A, 52B. Further embodiments may use an accumulator (not depicted) or alternate pressure source (not depicted) to achieve a desired pressure in the damper 602 across a critical rotor speed range of the high compressor 52A, 52B including a resonant frequency of the high compressor 52A, 52B.

Figure 6A:
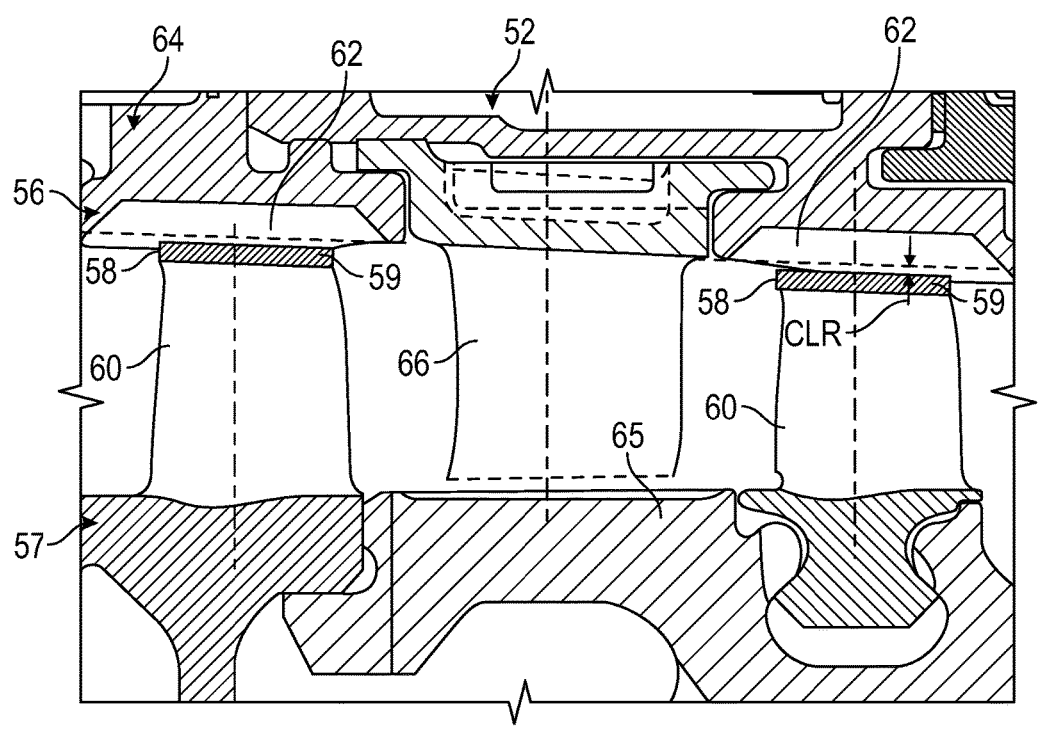
FIG. 6A is a partial sectional view of stages of a high compressor in accordance with an embodiment of the disclosure.
Figure 6B:
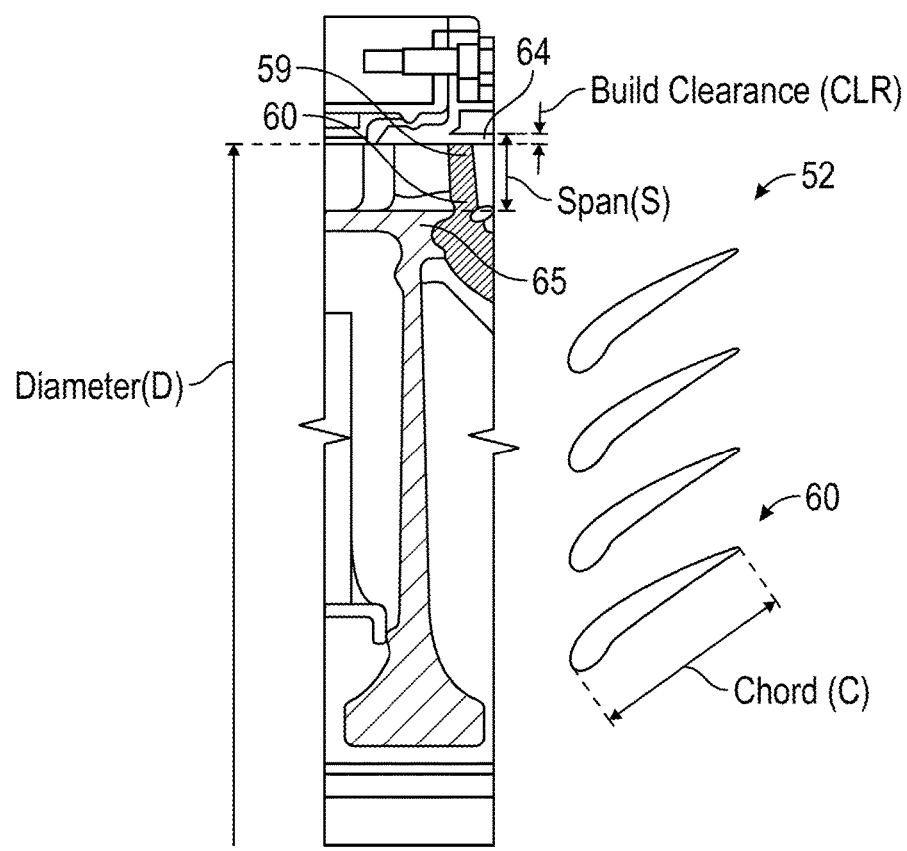
FIG. 6B is a view of several dimensional definitions of a portion of a high compressor in accordance with an embodiment of the disclosure.

FIG. 6A depicts a partial sectional view of stages 57 of a high compressor 52, such as the high compressor 52A of FIG. 4 or the high compressor 52B of FIG. 5. A rotor abrasion system 56 includes abrasive blade tips 58 as on one or more tips 59 of rotor blades 60 of the high compressor 52 and one or more rub strips 62 formed of a semi-solid material on an engine casing assembly interior surface 64 of gas turbine engines 10A, 10B of FIG. 1. Stages 57 of rotor blades 60 are defined with respect to corresponding stator vanes 66. Not all stages 57 of the high compressor need to include abrasive tips 58 and corresponding rub strips 62. Rather, the rotor blades 60 that include abrasive tips 58 may be constrained to stages 57 of the high compressor 52 closer to the combustor of the gas turbine engines 10A, 10B. For instance, the final one to four stages 57 of the high compressor 52 may include the abrasive tips 58 as such stages 57 can have a greater degree of deflection dues to bowed rotor conditions. Due to the high temperature environment of the high compressor 52, rubber compound material may not be a viable option for the rub strips 62. The semi-solid material of the rub strips can be a porous metal compound that can be ground down by the abrasive tips 58. The abrasive tips 58 can be formed of a material such as cubic boron nitride. A tip clearance CLR is defined between the tips 59 of rotor blades 60 of the high compressor 52 and the surface of the rub strips 62. In embodiments, a ratio of cold-rotor build clearance (e.g., a tip clearance CLR) to a span S (FIG. 6B) is between 0.7% and 7%, where the cold-rotor build clearance CLR is defined for a plurality of rotor blades 60 of the high compressor 52 with respect to the engine casing assembly interior surface 64 of the high compressor 52, and the span S is defined as a gap between a rotor disk 65 of the high compressor 52 and the engine casing assembly interior surface 64 of the high compressor 52 for at least the last two stages 57 of the high compressor 52 closest to a combustor section 26A, 26B (FIGS. 4, 5) of the gas turbine engine 10. Additional ratios can be defined, such as a ratio of the cold-rotor build clearance CLR to a rotor diameter D (FIG. 6B) of the high compressor 52 between 0.02% and 0.3%. A ratio of the cold-rotor build clearance CLR to a chord C (FIG. 6B) of the rotor blades 60 of the high compressor 52 can be between 0.5% and 5%. Adjustments to the span S and/or the diameter D can impact fuel burn, while adjustments to the chord C can impact compressor stability. In some embodiments, damaged rotor blades 60 are replaceable but at great expense due to accessibility challenges and often result in many other parts being replaced/overhauled in conjunction with a damaged blade. In other embodiments, the rotor blades 60 and the rotor disk 65 are integrally formed (e.g., an integrally bladed rotor), resulting in a full replacement of the rotor disk 65 and rotor blades 60 as well as ancillary components when sufficient damage is sustained to at least one of the rotor blades 60.

Figure 7:
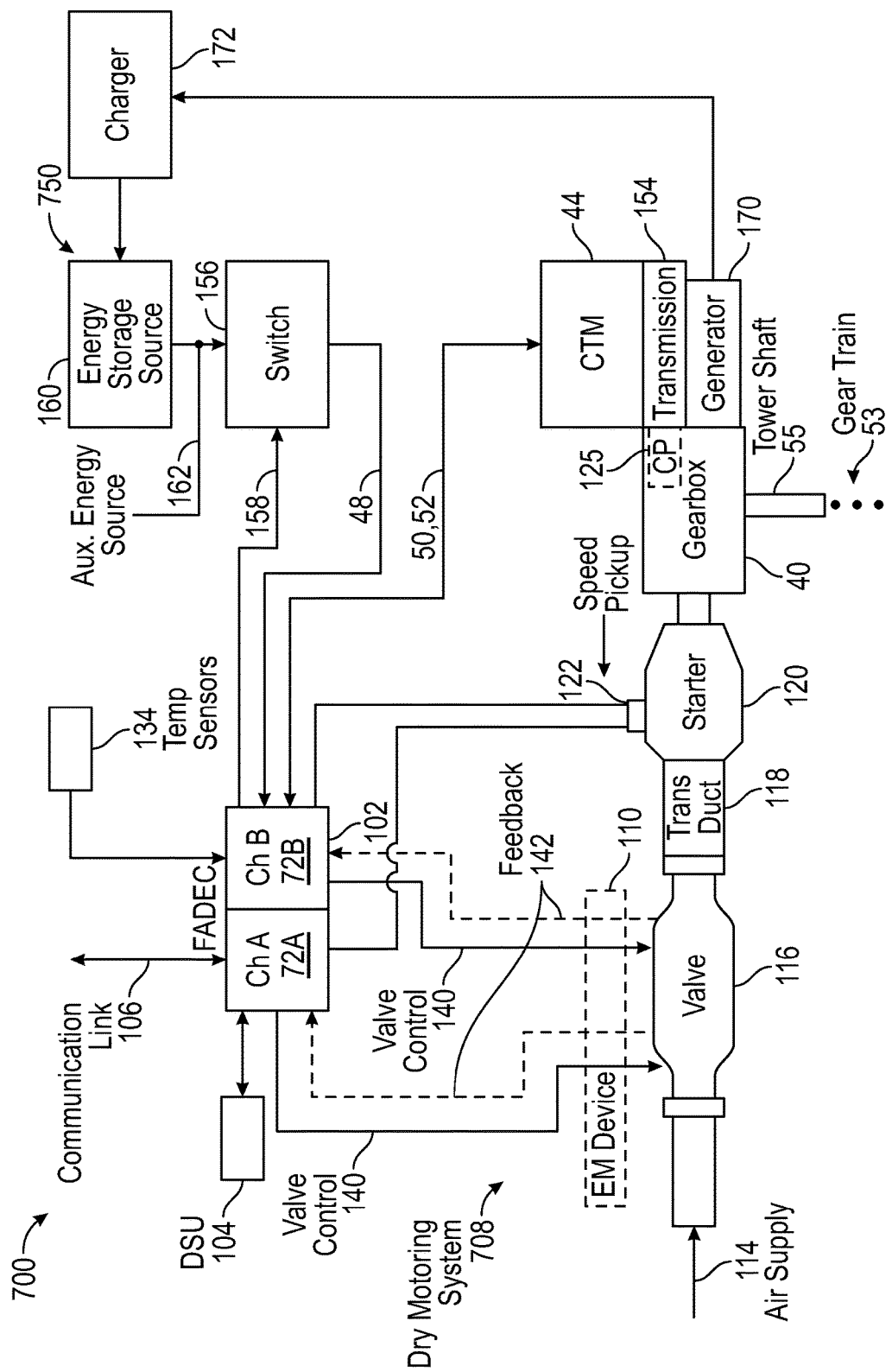
FIG. 7 is a block diagram of a bowed rotor prevention system according to an embodiment of the disclosure.

Turning now to FIG. 7, a schematic of a starting system 700 for either of the gas turbine engines 10A, 10B of FIG. 1 is depicted according to an embodiment. The starting system 700 is also referred to generally as a gas turbine engine system. In the example of FIG. 7, the starting system 700 includes FADEC 102 (e.g., one of the FADECs 102A, 102B of FIG. 1) with channel A 72A and channel B 72B. The starting system 700 can also include a data storage unit (DSU) 104 that retains data between shutdowns of a corresponding gas turbine engine 10A, 10B of FIG. 1. The DSU 104 includes non-volatile memory and retains data between cycling of power to the FADEC 102 and DSU 104. Communication bus 106 can include an aircraft and/or test stand communication bus to interface with aircraft controls, e.g., a cockpit, various onboard computer systems, and/or a test stand.

A dry motoring system 708 is operable to drive rotation of a starting spool (e.g., high spool 33) of the gas turbine engine 10. Either or both channels 72A, 72B of FADEC 102 can alternate on and off commands to an electromechanical device 110 which may be coupled to a starter valve 116 to achieve a partially open position of the starter valve 116 to control a flow from compressed air source 114 (also referred to as air supply 114) through a transfer duct 118 to an air turbine starter 120 (also referred to as starter 120 or pneumatic starter motor 120) to drive rotation of a starting spool of the gas turbine engine 10 below an engine idle speed. The compressed air source 114 can be provided by any known source of compressed air, such as an auxiliary power unit or ground cart.

The FADEC 102 can monitor a speed sensor, such as speed pickup 122 that may sense the speed of the engine rotor through its connection to gearbox 40 which is in turn connected to the high spool 33 via tower shaft 55 through a gear train 53 (e.g., rotational speed of high spool 33) or any other such sensor for detecting or determining the speed of the gas turbine engine 10. The starter 120 may be coupled to the gearbox 40 of the gas turbine engine 10 directly or through a transmission 154, such as a clutch system. The FADEC 102 can establish a control loop with respect to rotor speed to adjust positioning of the starter valve 116.

The starter valve 116 may be designed as an on/off valve which is typically commanded to either fully opened or fully closed. However, there is a time lag to achieve the fully open position and the fully closed position. By selectively alternating an on-command time with an off-command time through the electromechanical device 110, intermediate positioning states (i.e., partially opened/closed) can be achieved. The FADEC 102 can modulate the on and off commands (e.g., as a duty cycle using pulse width modulation) to the electromechanical device 110 to further open the starter valve 116 and increase a rotational speed of the starting spool of the gas turbine engine 10. In an embodiment, the electromechanical device 110 has a cycle time defined between an off-command to an on-command to the off-command that is at most half of a movement time for the starter valve 116 to transition from fully closed to fully open. Pneumatic lines or a mechanical linkage (e.g., via valve control 140) can be used to drive the starter valve 116 between the open position and the closed position. The electromechanical device 110 can be a solenoid that positions the starter valve 116 based on intermittently supplied electric power as commanded by the FADEC 102. In an alternate embodiment, the electromechanical device 110 is an electric valve controlling muscle air to adjust the position of the starter valve 116 as commanded by the FADEC 102.

Rather than using an electromechanical device 110 coupled to the starter valve 116 to achieve a partially open position of the starter valve 116, the dry motoring system 708 can use a variable position starter valve as the starter valve 116. Either or both channels of FADEC 102 can output a valve control signal 140 operable to dynamically adjust a valve angle of the starter valve 116 that selectively allows a portion of the air supply 114 to pass through the starter valve 116 and transfer duct 118 to air turbine starter 120. The starter valve 116 can be a continuous/infinitely adjustable valve that can hold a commanded valve angle, which may be expressed in terms of a percentage open/closed and/or an angular value (e.g., degrees or radians). Performance parameters of the starter valve 116 can be selected to meet dynamic response requirements of the starting system 700. For example, in some embodiments, the starter valve 116 has a response rate of 0% to 100% open in less than 40 seconds. In other embodiments, the starter valve 116 has a response rate of 0% to 100% open in less than 30 seconds. In further embodiments, the starter valve 116 has a response rate of 0% to 100% open in less than 20 seconds.

In some embodiments, the FADEC 102 can monitor a valve angle of the starter valve 116 using valve angle feedback signals 142 provided to both channels 72A, 72B of FADEC 102. As one example, in an active/standby configuration, both channels 72A, 72B of the FADEC 102 can use the valve angle feedback signals 142 to track a current valve angle, while only one channel 72A or 72B designated as an active channel outputs valve control signal 140. Upon a failure of the active channel, the standby channel of FADEC 102 can take over as the active channel to output valve control signal 140. In an alternate embodiment, both channels 72A, 72B of FADEC 102 output all or a portion of a valve angle command simultaneously on the valve control signals 140. The FADEC 102 can establish an outer control loop with respect to rotor speed and an inner control loop with respect to the valve angle of the starter valve 116.

When needed, dry motoring can be performed according to one or more processes as described in U.S. patent application Ser. No. 15/042,794, which is incorporated by reference herein in its entirety.

One or more temperature sensors 134, such as thermocouples, can provide measured temperatures at associated locations of the gas turbine engine 10 to the FADEC 102. For example, the temperature sensors 134 can be located at station 2 (T2), station 3 (T3), station 4 (T4), station 5 (T5) and/or other locations defined with respect to well-known station nomenclature for gas turbine engines.

The starting system 700 of FIG. 7 also includes a core-turning motoring system 750 (also referred to as an auxiliary drive system) that includes core turning motor 44 that is operable to drive rotation of the starting spool (e.g., high spool 33) of the gas turbine engine 10 through gearbox 40. A transmission 154 may be interposed between the core turning motor 44 and the gearbox 40 for reduction gearing which may include one or more clutches. The transmission 154 can interface with the gearbox 40 at a manual crank pad 125 location. In alternate embodiments, the transmission 154 interfaces with an alternate portion of the gearbox 40, and/or the transmission 154 is integrally formed with the gearbox 40 or an accessory of the gearbox 40. The core-turning motoring system 750 can also include a switch 156 that may be commanded by either or both channels 72A, 72B of the FADEC 102 (e.g., using enable 158) to provide electrical power for the core turning motor 44 in a low-power bowed rotor prevention mode. According to various embodiments, the switch 156 may be a mechanical switch, electrical relay, or other mechanism for controlling the distribution of electrical power to the core-turning motoring system 750. Electrical power may be provided from an energy storage source 160 and/or an auxiliary energy source 162, such as ground power or other aircraft/external source. The energy storage source 160 can be a battery or capacitor of an aircraft electrical system, which may be charged by a generator 170 through a charger 172. The generator 170 may be driven by the gearbox 40 (e.g., during operation of the gas turbine engine 10) or other source of rotational energy on the aircraft. Examples of the generator 170 include a permanent magnet alternator/generator, an integrated drive generator, a variable frequency generator, and other generator technologies known in the art.

In various embodiments, the core-turning motoring system 750 or the dry motoring system 708 can be used to prevent/mitigate a bowed rotor condition depending on the present operating characteristics of the gas turbine engine 10. The FADEC 102 in combination with the dry motoring system 708 and the core-turning motoring system 750 are each examples of a bowed rotor management system operable to prevent and/or mitigate a bowed rotor condition of the gas turbine engine 10. In an embodiment, the FADEC 102 is operable to engage the core turning motor 44 and drive rotation of the engine core of the gas turbine engine 10. Once in the low-power bowed rotor prevention mode, the FADEC 102 may drive rotation of the core turning motor 44 until a time or temperature threshold is met or a shutoff request is detected based on one or more of: a detected opening of a nacelle of the gas turbine engine 10, a shutoff switch accessible to maintenance personnel on the nacelle or the gas turbine engine 10, a computer interface command on the aircraft, a detected fault condition, a time limit, a temperature limit, or a start command of the gas turbine engine 10 of FIG. 1. Rotation can be continuous or periodic based on time and/or sensed position.

Figure 8:
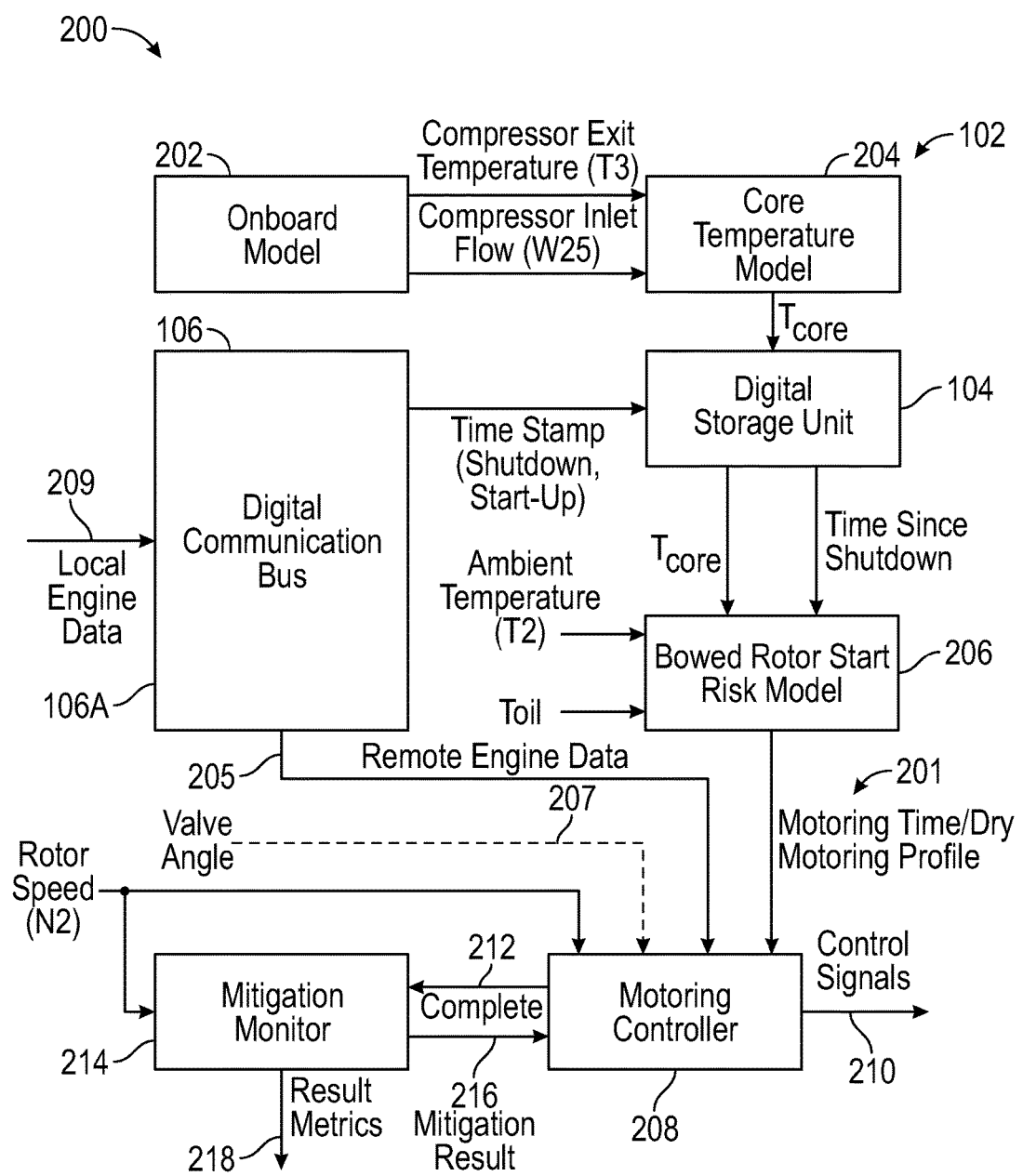
FIG. 8 is a block diagram of a system for bowed rotor start mitigation in accordance with an embodiment of the disclosure.

FIG. 8 is a block diagram of a system 200 for bowed rotor start mitigation that may control either of the starter air valves 116A, 116B of FIGS. 1 and 2, the starter switches 316A, 316B of FIG. 3, or starter valve 116 of FIG. 7 via control signals 210 in accordance with an embodiment. The system 200 may also be referred to as a bowed rotor start mitigation system. In the example of FIG. 8, the system 200 includes an onboard model 202 operable to produce a compressor exit temperature $T_3$ and a compressor inlet flow $W_{25}$ of one of the gas turbine engines 10A, 10B of FIG. 1 for use by a core temperature model 204. The onboard model 202 is configured to synthesize or predict major temperatures and pressures throughout one of the gas turbine engines 10A, 10B of FIG. 1 beyond those sensed by sensors positioned about the gas turbine engines 10A, 10B. The onboard model 202 and core temperature model 204 are examples of a first thermal model and a second thermal model that may be separately implemented or combined as part of a controller 102 (e.g., FADECs 102A, 102B of FIG. 1).

Engine parameter synthesis is performed by the onboard model 202, and the engine parameter synthesis may be performed using the technologies described in U.S. Patent Publication No. 2011/0077783, the entire contents of which are incorporated herein by reference thereto. Of the many parameters synthesized by onboard model 202 at least two are outputted to the core temperature model 204, $T_3$, which is the compressor exit gas temperature of each gas turbine engine 10A, 10B and $W_{25}$, which is the air flow through the compressor. Each of these values are synthesized by onboard model 202 and inputted into the core temperature model 204 that synthesizes or provides a heat state ($T_{core}$) of each gas turbine engine 10A, 10B. $T_{core}$ can be determined by a first order lag or function of $T_3$ and a numerical value X (e.g., $f(T_3, X)$), wherein X is a value determined from a lookup table stored in memory of controller 102. Accordingly, X is dependent upon the synthesized value of $W_{25}$. In other words, $W_{25}$ when compared to a lookup table of the core temperature model 204 will determine a value X to be used in determining the heat state or $T_{core}$ of each gas turbine engine 10A, 10B. In one embodiment, the higher the value of $W_{25}$ or the higher the flow rate through the compressor the lower the value of X.

The heat state of each engine 10A, 10B during use or $T_{core}$ is determined or synthesized by the core temperature model 204 as each engine 10A, 10B is being run. In addition, $T_3$ and $W_{25}$ are determined (e.g., measured) or synthesized by the onboard model 202 and/or the controller 102 as each engine 10A, 10B is being operated.

At engine shutdown, the current or most recently determined heat state of the engine or $T_{core\ shutdown}$ of an engine 10A, 10B is recorded into data storage unit (DSU) 104, and the time of the engine shutdown $t_{shutdown}$ is recorded into the DSU 104. The DSU 104 retains data between shutdowns using non-volatile memory. Each engine 10A, 10B may have a separate DSU 104. Time values and other parameters may be received on digital communication bus 106 and/or cross engine bus 106A. As long as electrical power is present for the controller 102 and DSU 104, additional values of temperature data may be monitored for comparison with modeled temperature data to validate one or more temperature models (e.g., onboard model 202 and/or core temperature model 204) of each gas turbine engine 10A, 10B.

During an engine start sequence or restart sequence, a bowed rotor start risk model 206 (also referred to as risk model 206) of the controller 102 is provided with the data stored in the DSU 104, namely $T_{core\ shutdown}$ and the time of the engine shutdown $t_{shutdown}$. In addition, the bowed rotor start risk model 206 is also provided with the time of engine start $t_{start}$ and the ambient temperature of the air provided to the inlet of each engine 10A, 10B $T_{inlet}$ or $T_2$. $T_2$ is a sensed value as opposed to the synthesized value of $T_3$ in some embodiments. In some embodiments, an oil temperature ($T_{oil}$) is a sensed value that can be used to determine a current temperature in combination with $T_{crre}$ and/or $T_2$. For instance, once oil stops circulating at shutdown, $T_{oil}$ can provide a localized temperature reading indicative of a bearing compartment temperature from which temperatures at various engine locations can be derived.

The bowed rotor start risk model 206 maps core temperature model data with time data and ambient temperature data to establish a motoring time tmotorin$_g$ as an estimated period of motoring to mitigate a bowed rotor of each gas turbine engine 10A, 10B. The motoring time $t_{motoring}$ is indicative of a bowed rotor risk parameter computed by the bowed rotor start risk model 206. For example, a higher risk of a bowed rotor may result in a longer duration of dry motoring to reduce a temperature gradient prior to starting each gas turbine engine 10A, 10B of FIG. 1. In one embodiment, an engine start sequence may automatically include a modified start sequence; however, the duration of the modified start sequence prior to a normal start sequence will vary based upon the time period $t_{motoring}$ that is calculated by the bowed rotor start risk model 206. The motoring time $t_{motoring}$ for predetermined target speed $N_{target}$ of each engine 10A, 10B is calculated as a function of $T_{core\ shutdown}$, $t_{shutdown}$, $t_{start}$, $T_2$ and/or $T_{oil}$, (e.g., $f(T_{core\ shutdown}, t_{shutdown}, t_{start}, T_2$ and/or $T_{oil})$, while a target speed $N_{target}$ is a predetermined speed that can be fixed or vary within a predetermined speed range of $N_{targetMin}$ to $N_{targetMax}$. In other words, the target speed $N_{target}$ may be the same regardless of the calculated time period $t_{motoring}$ or may vary within the predetermined speed range of $N_{targetMin}$ to $N_{targetMax}$. The target speed $N_{target}$ may also be referred to as a dry motoring mode speed. In some embodiments, the target speed $N_{target}$ defines a speed threshold that may be set statically or dynamically adjusted based on coordination commands from engine control interfaces 105A, 105B to determine when to command a corresponding starter air valve 116A, 116B (e.g., starter valve 116), or a corresponding starter switch 316A, 316B to close/open, for example.

Based upon these values ($T_{core\ shutdown}$, $t_{shutdown}$, $t_{start}$, $T_2$ and/or $T_{oil}$) the motoring time $t_{motoring}$ for the modified start sequence of each engine 10A, 10B is determined by the bowed rotor start risk model 206. Based upon the calculated time period $t_{motoring}$ which is calculated as a time to run each engine 10A, 10B up to a predetermined target speed $N_{target}$ in order to clear a "bowed condition". In accordance with an embodiment of the disclosure, the controller 102 can run through a modified start sequence upon a start command given to each engine 10A, 10B by an operator of the engines 10A, 10B, such as a pilot of an airplane the engines 10A, 10B are used with. It is understood that the motoring time $t_{motoring}$ of the modified start sequence may be in a range of 0 seconds to minutes, which depends on the values of $T_{core\ shutdown}$, $t_{shutdown}$, $t_{start}$, $T_2$ and/or $T_{oil}$.

In an alternate embodiment, the modified start sequence may only be run when the bowed rotor start risk model 206 has determined that the motoring time $t_{motoring}$ is greater than zero seconds upon receipt of a start command given to each engine 10A, 10B. In this embodiment and if the bowed rotor start risk model 206 has determined that $t_{motoring}$ is not greater than zero seconds, a normal start sequence will be initiated upon receipt of a start command to each engine 10A, 10B.

Accordingly and during an engine command start, the bowed rotor start risk model 206 of the system 200 may be referenced wherein the bowed rotor start risk model 206 correlates the elapsed time since the last engine shutdown time and the shutdown heat state of each engine 10A, 10B as well as the current start time $t_{start}$ and the inlet air temperature $T_2$ in order to determine the duration of the modified start sequence wherein motoring of each engine 10A, 10B up to a reduced speed $N_{target}$ without fuel and ignition is required. As used herein, motoring of each engine 10A, 10B in a pre-start motoring sequence refers to the turning of a starting spool by air turbine starter 120A, 120B or electric starter 320A, 320B up to a reduced speed $N_{target}$ without introduction of fuel and an ignition source in order to cool the engine 10A, 10B to a point wherein a normal start sequence can be implemented without starting the engine 10A, 10B in a bowed rotor state. In other words, cool or ambient air is drawn into the engine 10A, 10B while motoring the engine 10A, 10B at a reduced speed in order to clear the "bowed rotor" condition, which is referred to as a dry motoring mode.

The bowed rotor start risk model 206 can output the motoring time $t_{motoring}$ to a motoring controller 208. The motoring controller 208 uses a dynamic control calculation in order to determine a required valve position of the starter air valve 116A, 116B used to supply an air supply or compressed air source 114 to the engine 10A, 10B in order to limit the motoring speed of the engine 10A, 10B up to the target speed $N_{target}$ due to the position of the starter air valve 116A, 116B. The required valve position of the starter air valve 116A, 116B can be determined based upon an air supply pressure as well as other factors including but not limited to ambient air temperature, parasitic drag on the engine 10A, 10B from a variety of engine driven components such as electric generators and hydraulic pumps, and other variables such that the motoring controller 208 closes the loop for engine motoring for the required amount of time based on the output of the bowed rotor start risk model 206. Similar computations can be performed for switch timing of the starter switches 316A, 316B, which may be limited by a maximum current limit of the electric power source 314 of FIG. 3. Local engine data 209 can also be transmitted on digital communication bus 106 to the engine control interfaces 105A, 105B including present conditions, commands, and/or scheduled adjustments of the engine starting system 101A, 101B to assist the engine control interfaces 105A, 105B or other controllers 102 determine whether motoring time changes are needed on a per engine 10A, 10B basis as part of a multi-engine dry motoring coordination system 201. For instance, local engine data 209 can include a measured core engine temperature, an oil temperature, an ambient air temperature, an ambient pressure, a starting spool speed, and the like. The local engine data 209 can also include a number of control parameters such as a baseline dry motoring profile and/or adjustments to the baseline dry motoring profile (e.g., timing adjustments). Remote engine data 205 can be received including equivalent of local engine data 209 for one or more other engines 10A, 10B. The remote engine data 205 can be used to adjust the motoring time for the engine 10A, 10B controlled by the motoring controller 208. The motoring controller 208 can modify the initial value of the motoring time predicted by the bowed rotor start risk model 206 to adjust motoring time across the engines 10A, 10B, whether controlled according to one or more target speeds and/or a dry motoring profile. In alternate embodiments, the bowed rotor start risk model 206 is omitted and motoring timing and/or other motoring constraints are received via the digital communication bus 106. Adjustments can be implemented as control laws that adjust for power source variations that can be attributable to simultaneous bowed rotor mitigation/prevention on multiple gas turbine engines, environmental impacts on the power source, and/or adjustments due to an error condition, such as stuck open or stuck closed valve.

In one embodiment, the dynamic control of the valve position (e.g., open state of the valve (e.g., fully open, ½ open, ¼ open, etc.) in order to limit the motoring speed of the engine 10A, 10B) is controlled via duty cycle control (on/off timing using pulse width modulation) of electromechanical device 110A, 110B for starter air valves 116A, 116B. When variable position starter air valves are used as the starter air valves 116A, 116B, a valve angle 207 can be provided to motoring control 208 based on valve angle feedback. A rotor speed N2 can be provided to the motoring controller 208 and a mitigation monitor 214, where motoring controller 208 and a mitigation monitor 214 may be part of controller 102.

The risk model 206 can determine a bowed rotor risk parameter that is based on the heat stored ($T_{core}$) using a mapping function or lookup table. When not implemented as a fixed rotor speed, the bowed rotor risk parameter can have an associated dry motoring profile defining a target rotor speed profile over an anticipated amount of time for the motoring controller 208 to send control signals 210, such as valve control signals for controlling starter air valves 116A, 116B of FIG. 1 or starter switches 316A, 316B of FIG. 3.

The bowed rotor risk parameter may be quantified according to a profile curve selected from a family of curves that align with observed aircraft/engine conditions that impact turbine bore temperature and the resulting bowed rotor risk. In some embodiments, an anticipated amount of dry motoring time can be used to determine a target rotor speed profile in a dry motoring profile for the currently observed conditions. As one example, one or more baseline characteristic curves for the target rotor speed profile can be defined in tables or according to functions that may be rescaled to align with the observed conditions.

In summary with reference to FIG. 8, as one example of an aircraft 5 that includes systems as described herein, onboard model 202 and core temperature model 204 may run on controller 102 of the aircraft 5 to track heat stored (Torre) in the turbine at the time of engine shutdown. Modeling of potential heat stored in the system may be performed as a turbine disk metal temperature model in the core temperature model 204. When the aircraft lands, engines typically operate at idle for a cool down period of time, e.g., while taxiing to a final destination. When an engine shutdown is detected, model state data can be logged by the DSU 104 prior to depowering. When the controller 102 powers on at a later time and model state data can be retrieved from the DSU 104, and the bowed rotor start risk model 206 can be updated to account for the elapsed time. When an engine start is requested, a bowed rotor risk can be assessed with respect to the bowed rotor start risk model 206. Extended dry motoring can be performed during an engine start process until the bow risk has sufficiently diminished. The state of or changes to the local engine data 209 and remote engine data 205 can start/stop dry motoring and/or result in adjustments to motoring time and/or a dry motoring profile used to drive control signals 210.

In reference to FIG. 8, the mitigation monitor 214 can operate in response to receiving a complete indicator 212 to run a verification of the bowed rotor mitigation. The mitigation monitor 214 can provide mitigation results 216 to the motoring controller 208 and may provide result metrics 218 to other systems, such a maintenance request or indicator. The mitigation monitor 214 may also run while dry motoring is active to determine whether adjustments to the dry motoring profile are needed. If the mitigation monitor 214 determines that a bowed rotor condition still exists, the motoring controller 208 may restart dry motoring, or a maintenance request or indicator can be triggered along with providing result metrics 218 for further analysis. Metrics of attempted bowed rotor mitigation can be recorded in the DSU 104 based on determining that the attempted bowed rotor mitigation was unsuccessful or incomplete. Mitigation results 216 and/or result metrics 218 may also be included in the local engine data 209 sent to engine control interfaces 105A, 105B of FIG. 1. In embodiments, the mitigation monitor 214 is operable to sequence use of the at least two bowed rotor management systems, restart use of one or more of the at least two bowed rotor management systems, and trigger a maintenance request based on a detected bowed rotor elimination fault condition.

Figure 9:
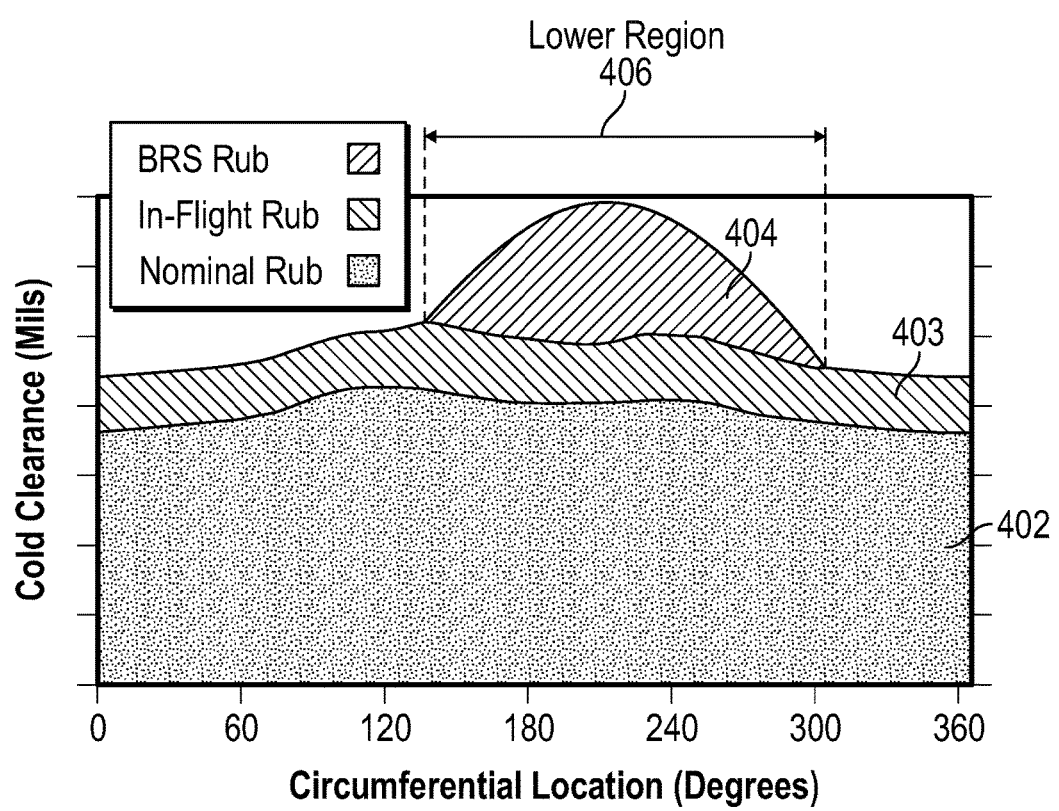
FIG. 9 depicts compressor rotor clearance examples and bowed rotor condition effects on cold clearances.

FIG. 9 depicts compressor rotor clearance examples and bowed rotor condition effects on cold clearances. A nominal rub 402 for a stage 57 of the high compressor 52 of FIG. 6A establishes an expected baseline minimum cold tip clearance as effects of multiple engine runs expand the cold tip build clearance due to rubbing effects during operation, which may further expand to an in-flight rub 403 profile while operating under a variety of flight conditions. If engine operation with a bowed rotor can be prevented, the clearance of the in-flight rub 403 can be maintained. However, if bowed rotor management is not used or available, a bowed rotor rub effect 404 can result in an increased cold clearance as the bowed rotor wears down a portion of the engine casing assembly interior surface 64, particularly at a lower region 406 forming a cold clearance imbalance. In one example, without using a bowed rotor mitigation system, a bowed rotor operability impact was observed as 15 mils of lost cold clearance at a last stage of a high compressor closest to the combustor and 7 mils of lost cold clearance at a second to last stage of a high compressor with an average of about 11 mils of lost cold clearance at the rear block. Such a lost cold clearance can result in a 13% stall margin loss, as well as losses in exhaust gas temperature and fuel burn efficiency. Embodiments that include one or more of the bowed rotor management systems as described herein can result in an improvement to a "bucket cruise Thrust Specific Fuel Consumption ('TSFC')" (industry standard parameter of lbm of fuel being burned divided by lbf of thrust the engine produces at that minimum point) of about 0.5% to 1.5% as observed, for instance.

Figure 10:
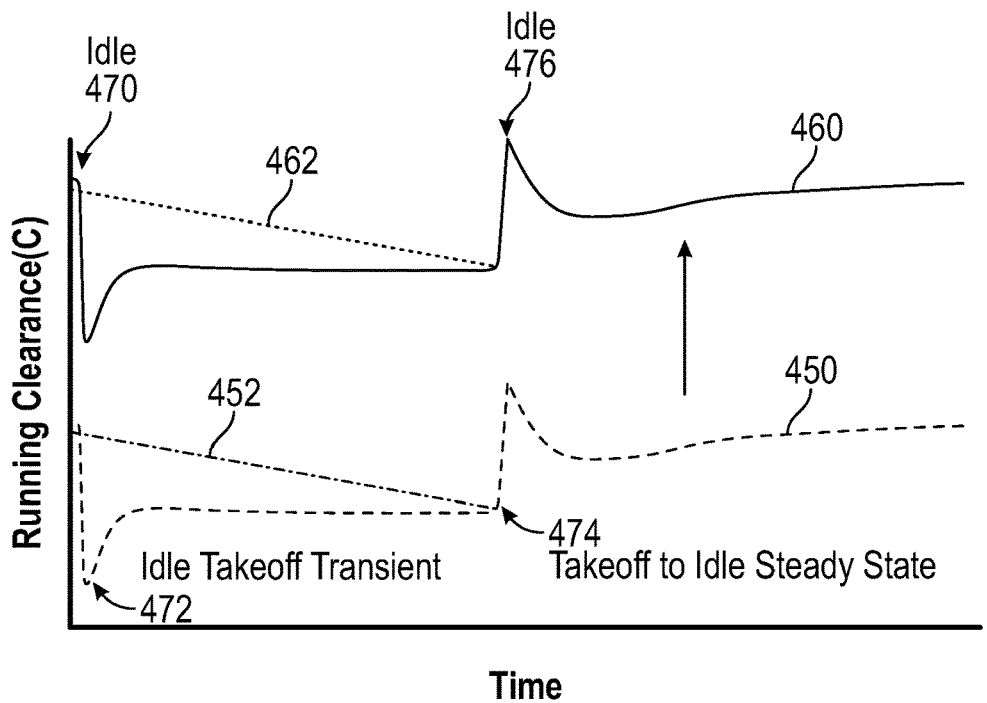
FIG. 10 depicts compressor rotor running clearance variation examples.

FIG. 10 depicts compressor rotor running clearance variation examples. Embodiments that include bowed rotor management systems as described herein can maintain a tighter running clearance 450 over a plurality of operating conditions as compared to the expanded running clearance 460 that can be observed after a bowed rotor rub expands the cold clearance. The running clearance or whirl clearance can change is response to speed changes and resonant frequencies. For example, between idle 470 and an idle takeoff transient 472, the tighter running clearance 450 and the expanded running clearance 460 can both dip as engine case opens faster than disks of the high compressor 52. As the disks of the high compressor 52 continue to react to the acceleration forces, the running clearance can stabilize up until transitioning from takeoff to idle steady state 474. At idle 476, the tighter running clearance 450 and the expanded running clearance 460 can both dip as engine case opens faster than disks of the high compressor 52. A clearance range can vary between idle-to-takeoff steady state as clearance range 452 for the tighter running clearance 450 and clearance range 462 for the expanded running clearance 460. Thus, even though the running clearance can vary depending upon the engine operating state, the net effect of a bowed rotor rub can be an increased running clearance as indicated by the expanded running clearance 460.

Figure 13:
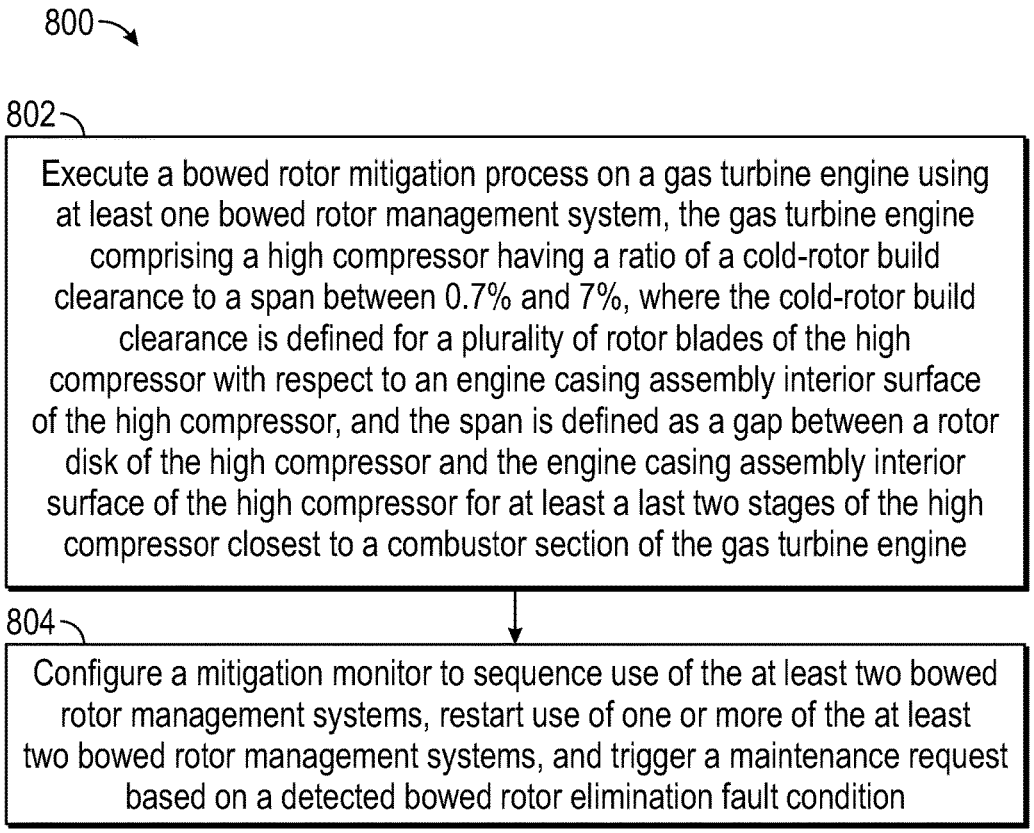
FIG. 13 is a flow chart illustrating a method in accordance with an embodiment of the disclosure.

FIG. 13 is a flow chart illustrating a method 800 in accordance with an embodiment. The method 800 of FIG. 13 is described in reference to FIGS. 1-12 and may be performed with an alternate order and include additional steps.

At block 802, a bowed rotor mitigation process is executed on a gas turbine engine 10 using at least one bowed rotor management system. The gas turbine engine 10 includes a high compressor 52 having a ratio of a cold-rotor build clearance CLR to a span S between 0.7% and 7%, where the cold-rotor build clearance CLR is defined for a plurality of rotor blades 60 of the high compressor 52 with respect to an engine casing assembly interior surface 64 of the high compressor 52, and the span S is defined as a gap between a rotor disk 65 of the high compressor 52 and the engine casing assembly interior surface 64 of the high compressor 52 for at least a last two stages 57 of the high compressor 52 closest to a combustor section 26 of the gas turbine engine 10. At least two bowed rotor management systems for the gas turbine engine 10 can be provided to prevent damage to the rotor blades 60 for a bowed rotor condition of the high compressor 52 under a plurality of operating conditions. The at least two bowed rotor management systems can include any a combination of: a rotor abrasion system 56, a core-turning motor system 750, a dry motoring system 708, a multi-engine dry motoring coordination system 201, and/or a damper system 41, 600 operable to maintain a minimum running clearance between the rotor blades 60 of the high compressor 52 and the engine casing assembly interior surface 64 across a critical rotor speed range 506 of the high compressor 52 including a resonant frequency 508 of the high compressor 52 (e.g., an oil pressure above 25 pounds per square inch gage). The gas turbine engine 10 can also include other conventional elements known in the art, such as additional compressor sections (e.g., low compressor, mid compressor), turbine sections, a combustor, various shafts, bearings, nozzles, gearing, and the like.

At block 804, a mitigation monitor 214 can be used to sequence use of the at least two bowed rotor management systems, restart use of one or more of the at least two bowed rotor management systems, and trigger a maintenance request based on a detected bowed rotor elimination fault condition.

A controller (e.g., FADEC 102) can be configured to select between use of the at least two bowed rotor management systems based on a status of the bowed rotor condition of the high compressor 52, a condition external to the gas turbine engine 10, and/or a mitigation monitor determination. The status of the bowed rotor condition can be determined initially using various sensors and models as previously described. Conditions external to the gas turbine engine 10 can include power source type, performance, capacity, fault status, operating conditions, environmental factors, commanded maintenance actions, and the like. The mitigation monitor 214 can sequence use of at least two bowed rotor management systems, restart use of one or more of the at least two bowed rotor management systems, and/or trigger a maintenance request based on a detected bowed rotor elimination fault condition. For example, if the core-turning motoring system 750 is unable to prevent/clear a bowed rotor condition, the dry motoring system 708 may be used to increase air flow for more rapid reduction of a bowed rotor condition. To deal with coordination issues and power source faults, the multi-engine dry motoring coordination system 201 can be used for simultaneous bowed rotor reduction for multiple gas turbine engines 10A, 10B. If contact between the rotor blades 60 and the engine casing assembly interior surface 64 cannot otherwise be avoided due to a bowed rotor condition, the abrasive blade tips 58 in combination with the one or more rub strips 62 of rotor abrasion system 56 can ensure that the rotor blades 60 of the high compressor 52 are not damaged as a result of the contact. The damper system 41A, 41B can reduce an amplification factor across the critical rotor speed range 506 to maintain a minimum running clearance where vibration effects would otherwise effectively reduce the running clearance below the minimum running clearance and risk contact/damage.

Accordingly and as mentioned above, it is desirable to detect, prevent and/or clear a "bowed rotor" condition in a gas turbine engine that may occur after the engine has been shut down. As described herein and in one non-limiting embodiment, the FADECs 102A, 102B (e.g., controller 102) and/or engine control interfaces 105A, 105B may be programmed to automatically take the necessary measures in order to provide for a modified start sequence without pilot intervention other than the initial start request. In an exemplary embodiment, the FADECs 102A, 102B, DSU 104 and/or engine control interfaces 105A, 105B each comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the FADECs 102A, 102B, DSU 104 and/or engine control interfaces 105A, 105B may include, but not be limited to, a processor(s), computer(s), memory, storage, register(s), timing, interrupt(s), communication interfaces, and input/output signal interfaces, as well as combinations comprising at least one of the foregoing. For example, the FADECs 102A, 102B, DSU 104 and/or engine control interfaces 105A, 105B may include input signal filtering to enable accurate sampling and conversion or acquisitions of such signals from communications interfaces. As described above, exemplary embodiments of the disclosure can be implemented through computer-implemented processes and apparatuses for practicing those processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A system comprising:
a high compressor of a gas turbine engine having a ratio of a cold-rotor build clearance to a span between 0.7% and 7%, wherein the cold-rotor build clearance is defined for a plurality of rotor blades of the high compressor with respect to an engine casing assembly interior surface of the high compressor, and the span is defined as a gap between a rotor disk of the high compressor and the engine casing assembly interior surface of the high compressor for at least a last two stages of the high compressor closest to a combustor section of the gas turbine engine; and
at least two bowed rotor management systems for the gas turbine engine to prevent damage to the rotor blades for a bowed rotor condition of the high compressor under a plurality of operating conditions.

2. The system as in claim 1, wherein at least one of the at least two bowed rotor management systems comprises a rotor abrasion system including abrasive blade tips on the rotor blades of the high compressor and one or more rub strips on the engine casing assembly interior surface.

3. The system as in claim 1, wherein at least one of the at least two bowed rotor management systems comprises a core-turning motor system.

4. The system as in claim 1, wherein at least one of the at least two bowed rotor management systems comprises a dry motoring system.

5. The system as in claim 1, wherein at least one of the at least two bowed rotor management systems comprises a multi-engine dry motoring coordination system.

6. The system as in claim 1, wherein at least one of the at least two bowed rotor management systems comprises a damper system operable to maintain a minimum running clearance between the rotor blades of the high compressor and the engine casing assembly interior surface across a critical rotor speed range of the high compressor including a resonant frequency of the high compressor with an oil pressure above 25 pounds per square inch gage.

7. The system as in claim 1, wherein the at least two bowed rotor management systems comprise a combination of: a rotor abrasion system, a core-turning motor system, a dry motoring system, a multi-engine dry motoring coordination system, and a damper system operable to maintain a minimum running clearance between the rotor blades of the high compressor and the engine casing assembly interior surface across a critical rotor speed range of the high compressor including a resonant frequency of the high compressor with an oil pressure above 25 pounds per square inch gage.

8. The system as in claim 1, further comprising a controller operable to determine a status of the bowed rotor condition of the high compressor, wherein the controller is operable to select between use of the at least two bowed rotor management systems based on the status of the bowed rotor condition of the high compressor or a condition external to the gas turbine engine.

9. The system as in claim 1, further comprising a mitigation monitor operable to sequence use of the at least two bowed rotor management systems, restart use of one or more of the at least two bowed rotor management systems, and trigger a maintenance request based on a detected bowed rotor elimination fault condition.

10. The system as in claim 1, wherein a ratio of the cold-rotor build clearance to a rotor diameter of the high compressor is between 0.02% and 0.3%, and a ratio of the cold-rotor build clearance to a chord of the rotor blades of the high compressor is between 0.5% and 5%.

11. A method comprising:
executing a bowed rotor mitigation process on a gas turbine engine using at least one bowed rotor management system, the gas turbine engine comprising a high compressor having a ratio of a cold-rotor build clearance to a span between 0.7% and 7%, wherein the cold-rotor build clearance is defined for a plurality of rotor blades of the high compressor with respect to an engine casing assembly interior surface of the high compressor, and the span is defined as a gap between a rotor disk of the high compressor and the engine casing assembly interior surface of the high compressor for at least a last two stages of the high compressor closest to a combustor section of the gas turbine engine, wherein at least two bowed rotor management systems for the gas turbine engine are provided to prevent damage to the rotor blades for a bowed rotor condition of the high compressor under a plurality of operating conditions.

12. The method as in claim 11, wherein at least one of the at least two bowed rotor management systems comprises a rotor abrasion system including abrasive blade tips on the rotor blades of the high compressor and one or more rub strips on the engine casing assembly interior surface.

13. The method as in claim 11, wherein at least one of the at least two bowed rotor management systems comprises a core-turning motor system.

14. The method as in claim 11, wherein at least one of the at least two bowed rotor management systems comprises a dry motoring system.

15. The method as in claim 11, wherein at least one of the at least two bowed rotor management systems comprises a multi-engine dry motoring coordination system.

16. The method as is claim 11, wherein at least one of the at least two bowed rotor management systems comprises a damper system operable to maintain a minimum running clearance between the rotor blades of the high compressor and the engine casing assembly interior surface across a critical rotor speed range of the high compressor including a resonant frequency of the high compressor with an oil pressure above 25 pounds per square inch gage.

17. The method as in claim 11, wherein the at least two bowed rotor management systems comprise a combination of: a rotor abrasion system, a core-turning motor system, a dry motoring system, a multi-engine dry motoring coordination system, and a damper system operable to maintain a minimum running clearance between the rotor blades of the high compressor and the engine casing assembly interior surface across a critical rotor speed range of the high compressor including a resonant frequency of the high compressor with an oil pressure above 25 pounds per square inch gage.

18. The method as in claim 11, further comprising:
configuring a controller to determine a status of the bowed rotor condition of the high compressor and select between use of the at least two bowed rotor management systems based on the status of the bowed rotor condition of the high compressor or a condition external to the gas turbine engine.

19. The method as in claim 11, further comprising:
configuring a mitigation monitor to sequence use of the at least two bowed rotor management systems, restart use of one or more of the at least two bowed rotor management systems, and trigger a maintenance request based on a detected bowed rotor elimination fault condition.

20. The method as in claim 11, wherein a ratio of the cold-rotor build clearance to a rotor diameter of the high compressor is between 0.02% and 0.3%, and a ratio of the cold-rotor build clearance to a chord of the rotor blades of the high compressor is between 0.5% and 5%.

* * * * *